(12) United States Patent
Iwai

(10) Patent No.: US 11,539,390 B2
(45) Date of Patent: Dec. 27, 2022

(54) SEMICONDUCTOR INTEGRATED CIRCUIT AND RECEPTION DEVICE

(71) Applicant: Kioxia Corporation, Tokyo (JP)

(72) Inventor: Takayuki Iwai, Setagaya (JP)

(73) Assignee: Kioxia Corporation, Tokyo (JP)

( * ) Notice: Subject to any disclaimer, the term of this patent is extended or adjusted under 35 U.S.C. 154(b) by 182 days.

(21) Appl. No.: 17/016,965

(22) Filed: Sep. 10, 2020

(65) Prior Publication Data

US 2021/0083706 A1 Mar. 18, 2021

(30) Foreign Application Priority Data

Sep. 18, 2019 (JP) .............................. JP2019-169822

(51) Int. Cl.
*H04B 1/24* (2006.01)

(52) U.S. Cl.
CPC ..................................... *H04B 1/24* (2013.01)

(58) Field of Classification Search
CPC ... H04B 1/24; H04L 25/0272; H04L 25/0292; H04L 25/03057; H04L 25/03878
See application file for complete search history.

(56) References Cited

U.S. PATENT DOCUMENTS

| | | | |
|---|---|---|---|
| 6,437,932 B1 | 8/2002 | Prater et al. | |
| 8,121,183 B2* | 2/2012 | Zhong | H04L 25/03057 375/233 |
| 9,973,355 B1* | 5/2018 | Cartina | H04L 25/03057 |
| 10,608,848 B1* | 3/2020 | Azenkot | H04L 25/03885 |
| 2006/0188043 A1* | 8/2006 | Zerbe | H04L 1/0026 375/233 |
| 2013/0308694 A1* | 11/2013 | Amamiya | H04L 25/03197 375/233 |
| 2017/0019275 A1* | 1/2017 | Norimatsu | H04B 3/08 |
| 2018/0276165 A1 | 9/2018 | Matsumoto | |

FOREIGN PATENT DOCUMENTS

| | | |
|---|---|---|
| JP | 10-83626 A | 3/1998 |
| JP | 3395283 B2 | 4/2003 |
| WO | WO 2017/061247 A1 | 4/2017 |

* cited by examiner

*Primary Examiner* — Nguyen T Vo
(74) *Attorney, Agent, or Firm* — Oblon, McClelland, Maier & Neustadt, L.L.P.

(57) ABSTRACT

According to one embodiment, in a semiconductor integrated circuit, a sampler is connected to an output node of a summer circuit. A shift register is connected to an output node of the sampler and includes K stages of registers, K being an integer that is equal to or larger than 3. To a control circuit, output nodes of respective registers of N-th to M-th stages among the K stages of registers are connected, N being an integer larger than 1 and smaller than K, M being an integer larger than N and equal to or smaller than K. A first switch includes one end connected to the output node of the summer circuit. A correction circuit includes a first control node that is connected to the control circuit through a first feedback line and an output node to which a second end of the first switch is connected.

20 Claims, 16 Drawing Sheets

SEMICONDUCTOR INTEGRATED CIRCUIT AND RECEPTION DEVICE

CROSS-REFERENCE TO RELATED APPLICATIONS

This application is based upon and claims the benefit of priority from Japanese Patent Application No. 2019-169822, filed on Sep. 18, 2019; the entire contents of which are incorporated herein by reference.

FIELD

Embodiments described herein relate generally to a semiconductor integrated circuit and a reception device.

BACKGROUND

In a communication system, a transmission device and a reception device may be connected to each other by a wired communication path to perform wired communications. This wired communications are desired to be appropriately performed.

DETAILED DESCRIPTION

In general, according to one embodiment, there is provided a semiconductor integrated circuit including a summer circuit, a sampler, a shift register, a control circuit, a first switch, and a correction circuit. The sampler is electrically connected to an output node of the summer circuit. The shift register is electrically connected to an output node of the sampler and includes K stages of registers, K being an integer that is equal to or larger than 3. To the control circuit, output nodes of respective registers of N-th to M-th stages among the K stages of registers are electrically connected, N being an integer larger than 1 and smaller than K, M being an integer larger than N and equal to or smaller than K. The first switch includes one end electrically connected to the output node of the summer circuit. The correction circuit includes a first control node that is electrically connected to the control circuit through a first feedback line and an output node to which a second end of the first switch is electrically connected.

Exemplary embodiments of a semiconductor integrated circuit will be explained below in detail with reference to the accompanying drawings. The present invention is not limited to the following embodiments.

First Embodiment

Figure 1:
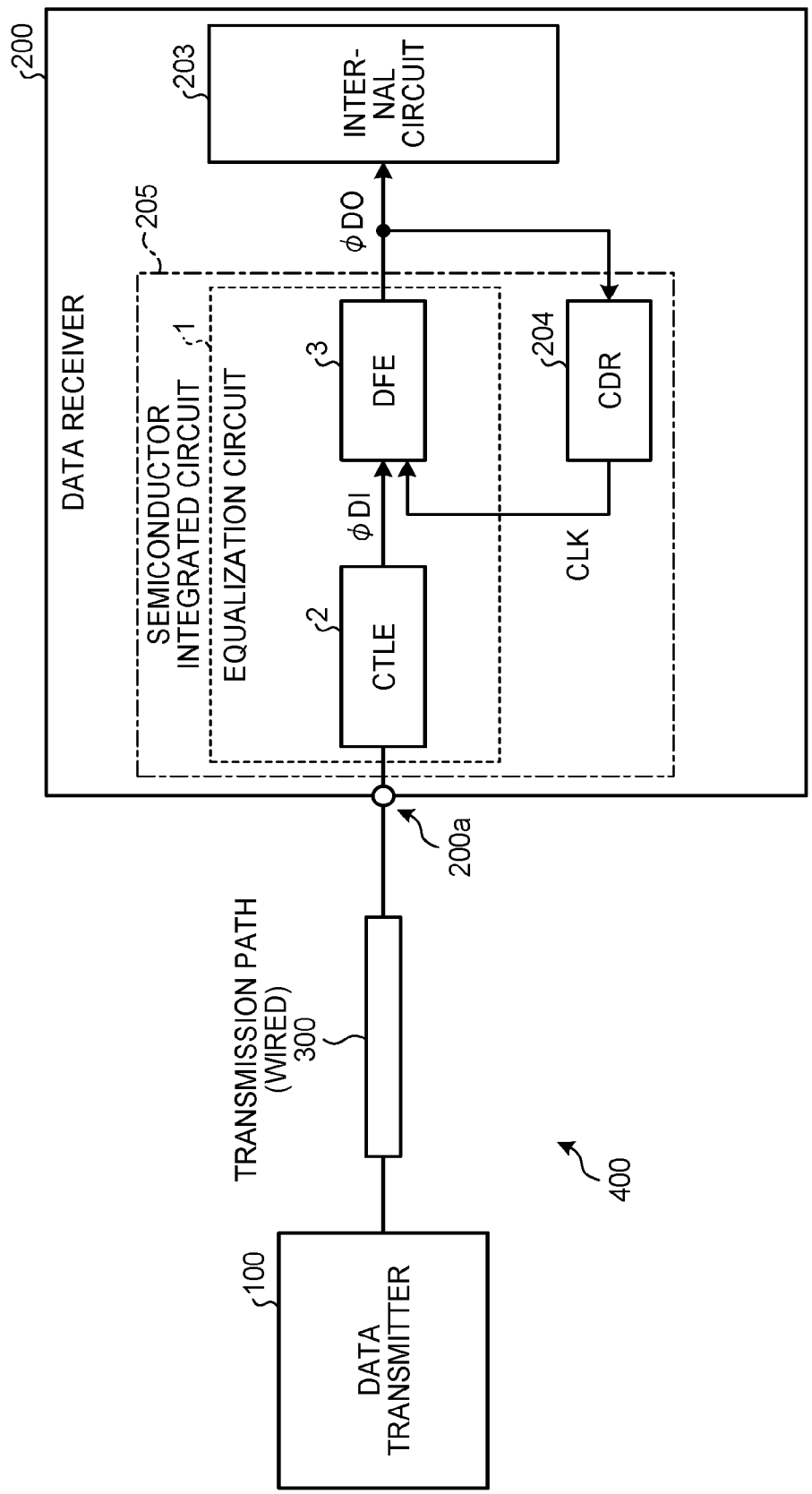
FIG. 1 is a block diagram illustrating a configuration of a communication system including a reception device including a semiconductor integrated circuit according to a first embodiment.

A data receiver including a semiconductor integrated circuit according to a first embodiment will be described with reference to FIG. 1. FIG. 1 is a diagram illustrating a configuration of a communication system 400 including a data receiver 200 provided with a semiconductor integrated circuit 205 including an equalization circuit 1.

The communication system 400 includes a data transmitter 100, the data receiver 200, and a wired communication path 300. The data transmitter 100 and the data receiver 200 are communicably connected via the wired communication path 300 serving as a transmission path. The data transmitter 100 transmits data to the data receiver 200 through the wired communication path 300. Specifically, the data receiver 200 has a reception node 200a to which the wired communication path 300 can be connected, and thus can receive data from the data transmitter 100 through the wired communication path 300.

The data transmitter 100 is a transmission device that transmits a signal as a result of given modulation (for example, binary modulation such as NRZ or pulse amplitude modulation (PAM)) performed on data to be transmitted, to the data receiver 200 through the wired communication path 300. The data receiver 200 is a reception device including the semiconductor integrated circuit 205 and an internal circuit 203. The semiconductor integrated circuit 205 includes the equalization circuit 1 and a Clock Data Recovery (CDR) circuit 204. The equalization circuit 1 is electrically connected to the reception node 200a. The semiconductor integrated circuit 205 is formed of one package or one or a plurality of chips (dies).

The equalization circuit 1 executes equalization processing on a modulation signal φDI using a clock CLK supplied from the CDR circuit 204, restores data φDO, and outputs the data φDO to the CDR circuit 204 and the internal circuit 203. The CDR circuit 204 reproduces the clock CLK from the data φDO. The CDR circuit 204 supplies the reproduced clock CLK to the equalization circuit 1. Then, the equalization circuit 1 again equalizes the modulation signal φDI using the clock CLK supplied from the CDR circuit 204. The CDR circuit 204 outputs one or more clocks CLK.

Figure 2A:
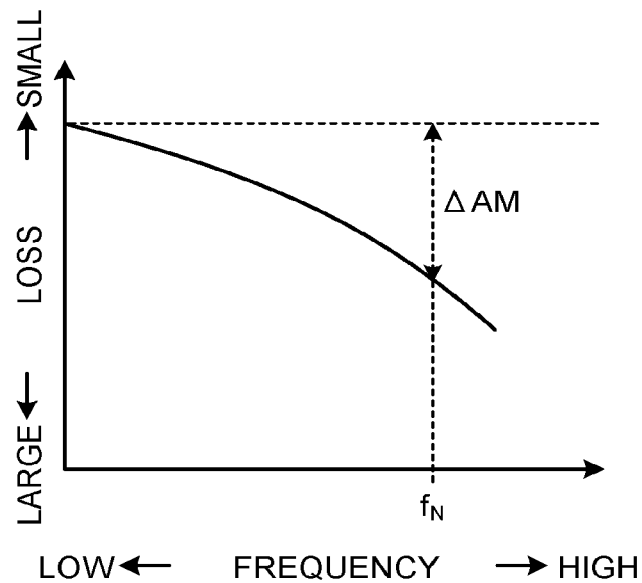
FIGS. 2A to 2C are diagrams illustrating a concept of frequency characteristics of a wired communication path, a CTLE circuit, and a DFE circuit according to the first embodiment.
Figure 2B:
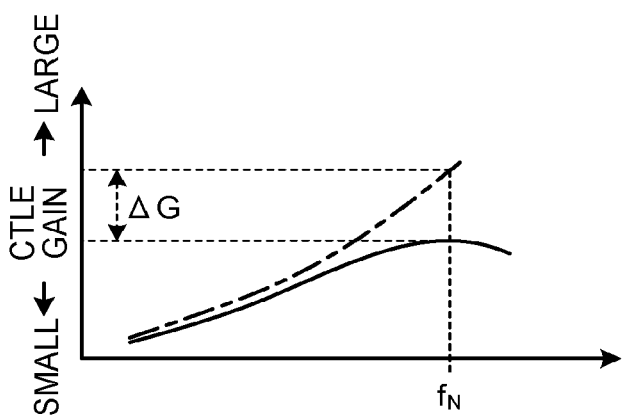
Figure 2C:
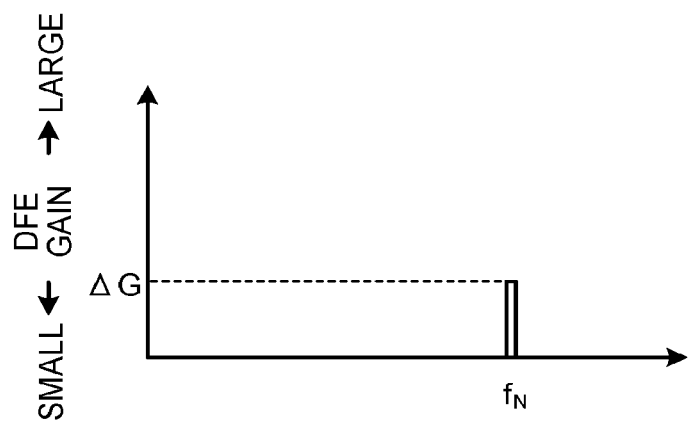

An equalizer technique can be used in order to reduce the occurrence of reception errors due to the influence of the transmission path loss of the wired communication path 300, which increases as the communication speed increases. However, the performance of the equalizer itself is reaching the limit under the constraints in terms of the process, area, and power of the semiconductor implementing the equalizer technique. The data rate in the wired communications are expected to increase to enable communications at higher frequencies. In view of this, improvement of the equalizer technique is required. Now, the frequency characteristics of the communication system 400 according to the embodiment will be described with reference to FIGS. 2A to 2C. FIGS. 2A to 2C are diagrams illustrating frequency characteristics of a wired communication path, a CTLE circuit, and a DFE circuit. The wired communication path 300 involves a channel loss due to the skin effect, dielectric loss, and the like of a lead wire. As a result, with respect to the signal intensity of a transmission signal in the wired communication path, a loss of high-frequency components is likely to be larger than that of a low-frequency component as illustrated in FIG. 2A. For example, ΔAM represents the loss of the signal intensity of the modulated signal φDI, at a Nyquist frequency (a frequency that is equal to or lower than half the data transfer rate according to NRZ) $f_N$. Here, the signal intensity corresponds to the gain achieved by a component in the signal transmission path.

In order to compensate for this attenuation, the equalization circuit 1 illustrated in FIG. 1 has a Continuous Time Linear Equalizer (CTLE) circuit 2 that executes first-stage equalization processing. The gain characteristic of the CTLE circuit 2 can be designed to be the inverse characteristic of the attenuation characteristic of the wired communication path 300, as indicated by the one-dot-chain line in FIG. 2B. However, in an actual scenario, the attenuation of ΔG from the characteristic indicated by the one-dot-chain line may occur at the Nyquist frequency $f_N$ as indicated by the solid line in FIG. 2B.

In view of this, the equalization circuit 1 illustrated in FIG. 1 includes a Decision Feedback Equalizer (DFE) circuit 3 that executes second-stage equivalent processing. The DFE circuit 3 may be designed to have a gain of ΔG around the Nyquist frequency $f_N$ as indicated by a solid line in FIG. 2C. The DFE circuit 3 compensates for the deterioration of the input signal with the gain of ΔG corresponding to the deterioration of the signal intensity due to the influence of the past input signal on the input signal, so as to perform compensation for the inter-symbol interference.

Specifically, the DFE circuit 3 determines whether data of each cycle up to the Nth cycle (N is an integer that is equal to or larger than 1) before the current time point is 0 or 1, and multiplies each result by a tap coefficient to feed back the resultant signal. Thus, the DFE circuit 3 implements waveform equalization corresponding to the gain of ΔG. A circuit that feeds back the signal obtained by multiplying the tap coefficient as described above is referred to as a tap, and the number N of taps is also referred to as a tap number.

Figure 3:
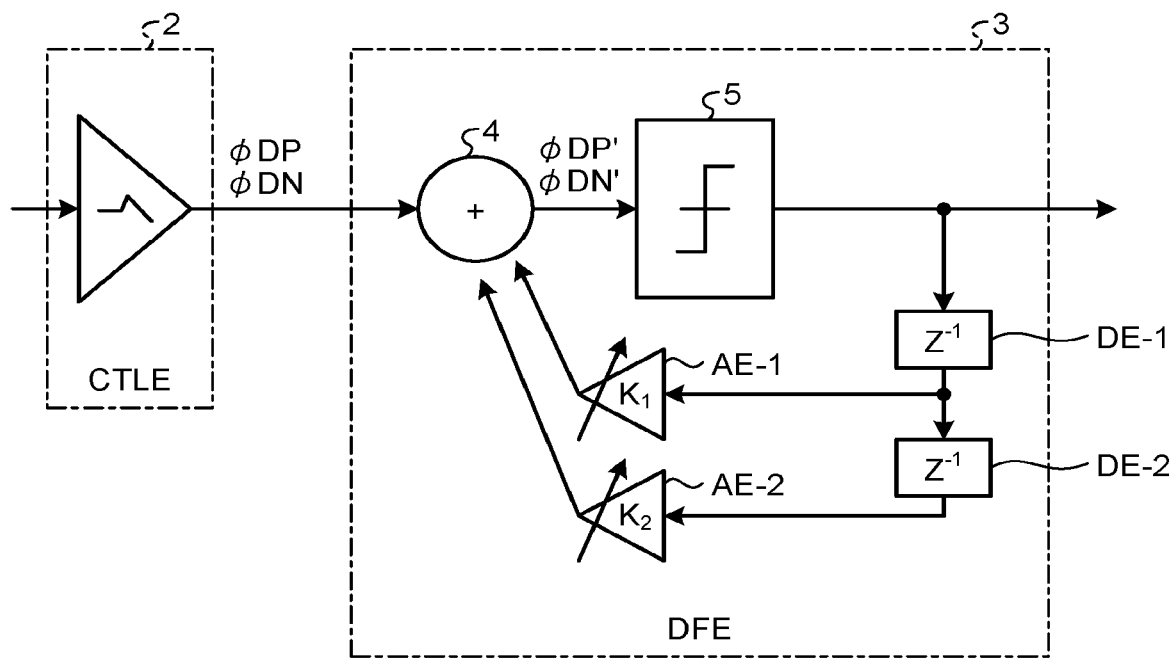
FIG. 3 is a circuit diagram illustrating a schematic configuration of the DFE circuit according to the first embodiment.

As illustrated in FIG. 3, the DFE circuit 3 includes a summer circuit 4, a determination circuit 5, a plurality of delay elements DE-1 and DE-2, and a plurality of multiplication elements AE-1 and AE-2. FIG. 3 is a circuit diagram illustrating a schematic configuration of the DFE circuit 3. FIG. 3 illustrates a case where the number of taps is two and the number of each of the delay elements DE and the multiplication elements AE in the DFE circuit 3 is two. However, the number of taps may be three or more.

The summer circuit 4 is provided between the CTLE circuit 2 and the determination circuit 5. The delay elements DE-1 and DE-2 and the multiplication elements AE-1 and AE-2 are each provided on a feedback path returning to the summer circuit 4 from the output node of the determination circuit 5. Each of the delay elements DE-1 and DE-2 provides a delay amount $Z^{-1}$. For example, the delay amount may be determined in a unit of one Unit Interval (UI). In such a case, the delay elements DE-1 and DE-2 provide a delay of one UI to the signal. This one UI is a unit interval of waveform processing and corresponds to one cycle of the clock CLK. The multiplication elements AE-1 and AE-2 respectively have tap coefficients $K_1$ and $K_2$ by which the output signals from the respective delay elements DE-1 are DE-2 are multiplied. Each of the multiplication elements AE-1 and AE-2 is also referred to as a tap circuit.

The summer circuit 4 can receive a pair of differential signals φDP and φDN from the CTLE circuit 2 as the signal φDI. The summer circuit 4 adds the feedback signals from the tap circuits to the respective differential signals φDP and φDN (for example, current addition), and supplies each of differential signals φDP' and φDN' as a result of the addition to the determination circuit 5.

For example, the determination circuit 5 determines whether the logical value of each of the differential signals φDP' and φDN' supplied is '0' or '1'. A signal as a result of the determination is delayed by one interval by the delay element DE-1, and the resultant signal is multiplied by the tap coefficient $K_1$ by the multiplication element AE-1, to be a first feedback signal supplied to the summer circuit 4. The first feedback signal is a feedback signal based on a data signal of the first interval before the current time point. A signal as a result of the determination is delayed by two intervals by the delay elements DE-1 and DE-2, and the resultant signal is multiplied by the tap coefficient $K_2$ by the multiplication element AE-2, to be a second feedback signal supplied to the summer circuit 4. The second feedback signal is a feedback signal based on a data signal of the second interval before the current time point.

Here, when the number of taps is 1, a simple increase in a value of the tap coefficient $K_1$, that is, a simple increase in the gain of the DFE circuit 3 beyond ΔG (see FIG. 2C) may result in distortion of the signal. Thus, with the simple increase in the gain of the DFE circuit 3, a favorable eye pattern opening is difficult to obtain, and sufficient Bit-Error-Rates (BER) are difficult to obtain. An attempt to achieve an eye pattern opening that guarantees BER=$10^{-12}$ may face difficulties in terms of, for example, the area and power of the semiconductor implementing the DFE circuit 3.

In this context, there is an appropriate value of the tap coefficient $K_1$ based on the characteristic of the wired communication path 300 and the characteristic of the equalization circuit 1. A circuit simulation to obtain the tap coefficient that is expected to be theoretically appropriate may result in $K_1 \approx 0.4$ for example.

However, the tap coefficient resolution of the DFE circuit 3 is limited, and thus there may be a difference between an actually appropriate tap coefficient and an ideal tap coefficient. The ideal tap coefficient is obtained assuming that the signal to be equalized is a one-pulse signal, but the actual signal is scrambled by a generator polynomial with random numbers. All things considered, it is difficult to determine the appropriate coefficient based on the characteristic of the actual wired communication path 300 and the characteristic of the equalization circuit 1 within a limited period of time. In other words, an operation of the DFE circuit 3 using the ideal tap coefficient is likely to result in fluctuation of the tap coefficient due to the operation not ceasing after a long waiting period.

The present inventors have examined the cause of this fluctuation, to find out that among the past data, those of a plurality of intervals more in the past than the immediately preceding data (that is, the data pattern at a quite a far point in the past) are influential. The present inventors further found that the data pattern includes a pattern (predetermined pattern) that is likely to affect the fluctuation.

Consider a case where the number of taps may be simply increased. For example, when a single cycle of the clock CLK serves as a single unit interval in the waveform processing and n and m are each an integer equal to or larger than 2, n-interval-prior data to (n+m−1)-interval-prior data before the current point affects the fluctuation, an increase in the number of taps by m−1 involving additional connection of m−1 tap circuits to the output node of the summer circuit 4 results in an increase in the output load of the summer circuit 4, and thus is likely to end up in performance degradation.

In view of this, in the present embodiment, a single tap circuit is added that operates when a pattern of data extracted in parallel from n-th to (n+m−1)-th stages among n+m−1 stages of shift registers on the output side of the summer circuit 4 in the DFE circuit 3 matches the predetermined pattern. Thus, the equalization accuracy of the DFE circuit 3 may be improved with increase of the number of taps to be prevented.

Specifically, the tap coefficient is corrected by a predetermined correction tap coefficient determined in advance, in response to the data of a certain predetermined interval in the past matching the predetermined pattern. The correction tap coefficient for the predetermined pattern is determined in advance from the result of foreground Least Mean Square (LMS) operation, and is set in the correction tap circuit. Because a tap circuit (current source) of a single tap is required to be added, the output load of the summer circuit 4 can be largely reduced compared with an example configuration where multiple tap circuits (current sources) are additionally connected to the output of the summer circuit 4 for removing Long tail ISI. Thus, the power consumption may be reduced.

Figure 4:
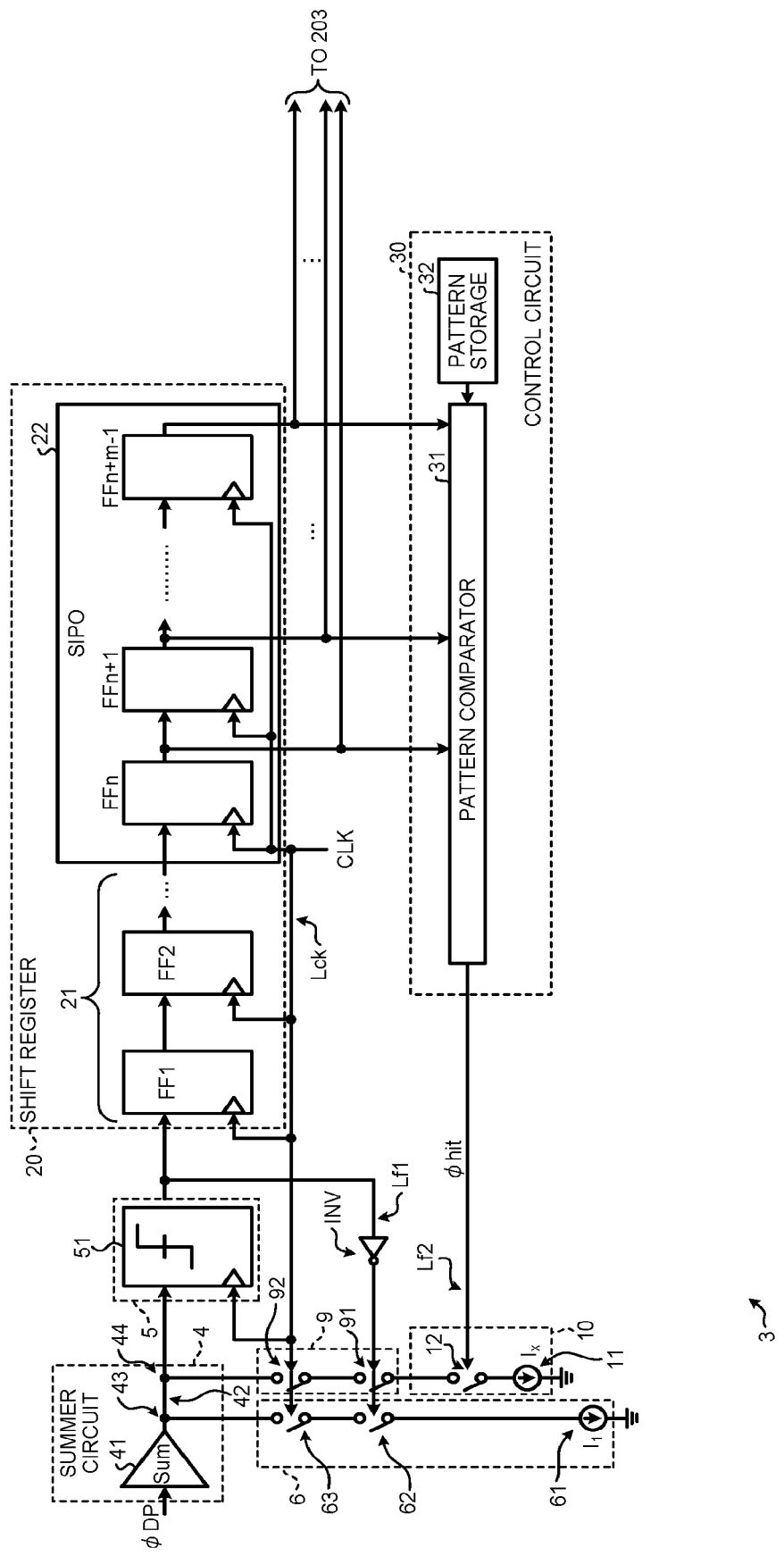
FIG. 4 is a circuit diagram illustrating an example of a configuration of the DFE circuit according to the first embodiment.

More specifically, the DFE circuit 3 may be configured as illustrated in FIG. 4. FIG. 4 is a circuit diagram illustrating an example of a configuration of the DFE circuit 3. The DFE circuit 3 may be configured to process a differential signal. In FIG. 4, a signal line and a circuit element on a P-side of the differential will be described for the sake of simplicity, but it is to be noted that a signal line and a circuit element on an N-side of the differential are configured similarly.

The DFE circuit 3 includes the summer circuit 4, the determination circuit 5, a shift register 20, a control circuit 30, a tap circuit 6, a switch circuit 9, and a correction tap circuit 10.

The summer circuit 4 is provided between the CTLE circuit 2 and the determination circuit 5. The tap circuit 6 is provided on a feedback path returning to the summer circuit 4 from the output node of the determination circuit 5. The correction tap circuit 10 is provided on a correction feedback path that returns to the summer circuit 4 from a plurality of parallel output nodes of the shift register 20 provided between the determination circuit 5 and the output node, via the control circuit 30 and the switch circuit 9. The control circuit 30, the correction tap circuit 10, and the switch circuit 9 are provided in this order on the correction feedback path.

Note that the plurality of parallel output nodes of the shift register 20 are electrically connected to the internal circuit 203 (see FIG. 1) via a bus having a bit width corresponding to the number of parallel nodes.

The summer circuit 4 receives the data signal ϕDP from the CTLE circuit 2. The summer circuit 4 adds a signal (feedback signal) fed back from the tap circuit 6 to the data signal ϕDP (for example, current addition). Further, when data output from the plurality of output nodes of the shift register 20 matches a predetermined pattern, the summer circuit 4 may further add a correction signal (current addition) fed back from the correction tap circuit 10 via the switch circuit 9 in response to a correction instruction from the control circuit 30. The summer circuit 4 supplies these addition results to the determination circuit 5.

The summer circuit 4 includes an amplifier 41, a signal line 42, a current addition node 43, and a current addition node 44. The amplifier 41 receives and amplifies the data signal ϕDP, and outputs the amplified signal. The amplifier 41 has an output node electrically connected to the signal line 42. The current addition node 43 and the current addition node 44 are provided on the signal line 42.

The determination circuit 5 includes a sampler 51. The sampler 51 may be configured in a form of a flip-flop, and has a data input node electrically connected to the signal line 42, a clock node electrically connected to the CDR circuit 204 (see FIG. 1) through a clock line Lck, and has an output node electrically connected to a feedback line Lf1 and an input node of the shift register 20.

In the determination circuit 5, the sampler 51 is, for example, a data sampler, and samples a data portion of the data signal ϕDP in synchronization with the clock CLK from the CDR circuit 204.

The feedback line Lf1 has an inverter INV provided thereon, and connects the output node of the sampler 51 to a control node of the tap circuit 6 and a control node of the switch circuit 9 via the inverter INV.

The tap circuit 6 receives a determination result signal from the determination circuit 5 through the feedback line Lf1. The tap circuit 6 corresponds to the multiplication element AE-1 illustrated in FIG. 3. The tap circuit 6 multiplies a signal obtained by delaying the determination result from the determination circuit 5 by one interval (1 UI) by the tap coefficient $K_1$ to generate a feedback signal. The tap circuit 6 supplies the feedback signal to the summer circuit 4. The tap circuit 6 includes a current source 61, a switch 62, and a switch 63. In the tap circuit 6, the feedback line Lf1 is connected to a control node of the switch 62, and the clock line Lck is connected to a control node of the switch 63.

The switch 63 is provided between the current addition node 43 and the switch 62, and the switch 62 is provided between the switch 63 and the current source 61. The signal line 42 and the current source 61 may be electrically connected to each other when the switch 63 and the switch 62 are both turned ON. The switch 62 and the switch 63 may comprise NMOS transistors. A current value $I_1$ that is supplied from the current source 61 is determined in advance based on the tap coefficient $K_1$. The connection order of the switch 62 and the switch 63 may be reversed.

The switch circuit 9 has one end electrically connected to the output node of the summer circuit 4 and has the other end electrically connected to the correction tap circuit 10. The switch circuit 9 includes a switch 91 and a switch 92. In the switch circuit 9, the feedback line Lf1 is connected to a control node of the switch 91, and the clock line Lck is connected to a control node of the switch 92.

The switch 92 is provided between the current addition node 44 and the switch 91, and the switch 91 is provided between the switch 92 and the correction tap circuit 10. The signal line 42 and the correction tap circuit 10 may be electrically connected to each other when the switch 92 and the switch 91 are both turned ON. Specifically, when the switch 92 and the switch 91 are both turned ON, the switch circuit 9 is turned ON to electrically connect the signal line 42 and the correction tap circuit 10 to each other. When at least one of the switch 92 and the switch 91 is turned OFF, the switch circuit 9 is turned OFF, and the signal line 42 and the correction tap circuit 10 are electrically disconnected from each other. The switch 91 and the switch 92 may comprise NMOS transistors. The connection order of the switch 91 and the switch 92 may be reversed.

The shift register 20 receives a determination result signal (data signal) from the determination circuit 5. The shift register 20 internally shifts the data signal from the input node side to the output node side in synchronization with the clock CLK. The shift register 20 outputs a plurality of data signals different from each other in the number of shifts, from the plurality of parallel output nodes. Thus, the shift register 20 outputs data signals of a plurality of different intervals in the past.

The shift register 20 includes n+m−1 stages of registers connected in series, where n and m are integers that is equal to or larger than 2. The n+m−1 stages of registers include an earlier stage part 21 including the registers of 1st stage to (n−1)-th stage and a later stage part 22 including the registers the n-th stage to (n+m−1)-th stage. The later stage part 22 may be configured as a Serial Input Parallel Output (SIPO) circuit. That is, the output nodes of the registers of the n-th stage to the (n+m−1)-th stage serve as a plurality of output nodes of the shift register 20 connected to each of the control circuit 30 and the internal circuit 203.

The control circuit 30 includes a plurality of input nodes connected to the plurality of output nodes of the shift register 20 and an output node connected to the feedback line Lf2.

Assuming that one cycle of the clock CLK is used as a unit interval (unit inverval) of the waveform processing and is simply referred to as an "interval", the control circuit 30 receives the n-interval-prior data signal to the (n+m−1)-interval-prior data signal before the current time point among the past data signals, via the plurality of output nodes of the shift register 20. The control circuit 30 stores in advance the predetermined pattern that is likely to affect the fluctuation of the tap coefficient. The control circuit 30 compares the pattern of the received data signal with the predetermined pattern, and depending on the result of the comparison, asserts a hit signal ϕhit and supplies the hit signal ϕhit to the correction tap circuit 10.

The control circuit 30 includes a pattern comparator 31 and a pattern storage 32. The pattern storage 32 stores the predetermined pattern. The predetermined pattern is determined in advance as a pattern that is likely to affect the fluctuation of the tap coefficient. The pattern comparator 31 receives the n-interval-prior data signal to the (n+m−1)-interval-prior data signal before the current time point among the past data signals, via the plurality of output nodes of the shift register 20, and acquires the predetermined pattern by referring to the pattern storage 32. The pattern comparator 31 compares the pattern of the received data signals with the acquired predetermined pattern, and asserts the hit signal ϕhit when the data signal pattern matches the predetermined pattern.

The feedback line Lf2 connects the output node of the control circuit 30 to the control node of the correction tap circuit 10.

The correction tap circuit 10 has the control node electrically connected to the control circuit 30, and has an output node electrically connected to the output node of the summer circuit 4 via the switch circuit 9. The correction tap circuit 10 can feed back the correction signal to the output node of the summer circuit 4 via the switch circuit 9 in response to the assertion of the hit signal ϕhit.

The correction tap circuit 10 includes a current source 11 and a switch 12. In the correction tap circuit 10, the feedback line Lf2 is connected to a control node of the switch 12.

The switch 12 is provided between the switch circuit 9 and the current source 11. The switch circuit 9 and the current source 11 may be electrically connected to each other when the switch 12 is turned ON in response to the assertion of the hit signal ϕhit. The switch 12 may comprise an NMOS transistor. This hit signal ϕhit may be a high active signal. Further, a current Ix that is supplied from the current source 11 is determined in advance based on a correction tap coefficient ΔK.

Figure 5:
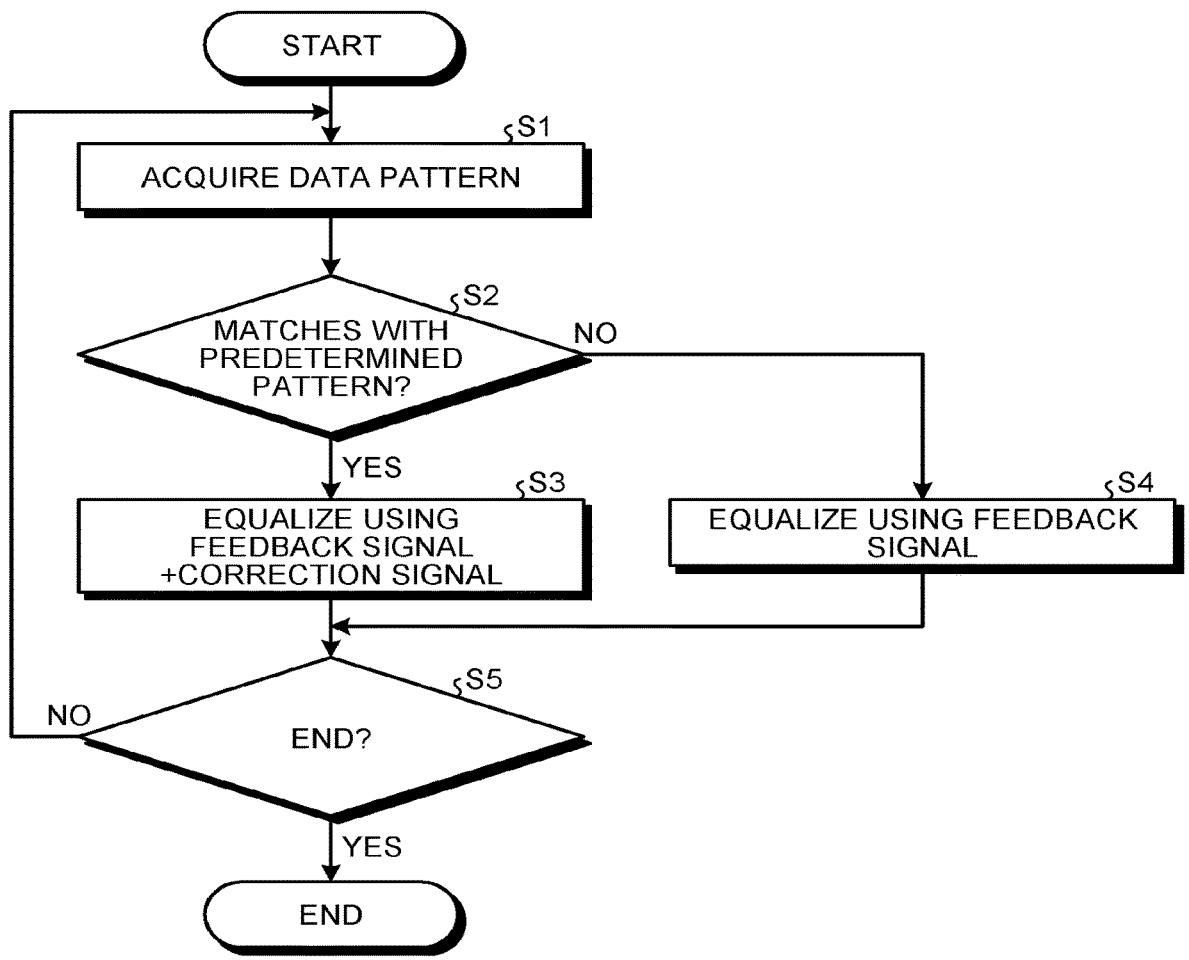
FIG. 5 is a flowchart illustrating an operation of the DFE circuit according to the first embodiment.

Next, an operation of the DFE 3 will be described using FIG. 5. FIG. 5 is a flowchart illustrating an operation of the DFE 3.

The DFE 3 samples the data signal ϕDP received from the CTLE 2, and when the data signal of the sampling result is obtained for (n+m−1)-th intervals, acquires the pattern (data pattern) of the n-interval-prior data signal to the (n+m−1)-interval-prior data signal before the current time point among the past data signals (S1). The DFE 3 compares the acquired data pattern with the predetermined pattern stored in advance (S2).

When the acquired data pattern matches the predetermined pattern (Yes in S2), the DFE3 equalizes the current data signal ϕDP with "feedback signal based on tap coefficient $K_1$"+"correction signal based on correction tap coefficient ΔK" (S3).

When the acquired data pattern does not match the predetermined pattern (No in S2), the DFE3 equalizes the current data signal ϕDP with the "feedback signal based on tap coefficient $K_1$" (S4).

The DFE 3 repeats the processing in S1 to S4 at a given sampling cycle until an operation end instruction is received (No in S5), and stops the operation upon receiving the operation end instruction (Yes in S5).

As described above, in the present embodiment, in the DFE circuit 3, a single tap circuit (correction tap circuit 10) is provided, which operates when the pattern of the data signals extracted in parallel from the shift registers of the n-th to (n+m−1)-th stages among the n+m−1 stages of shift registers connected to the output side of the summer circuit 4 matches the predetermined pattern. With this configuration, the number of additional taps can be reduced (for example, to one) with checking the pattern of the data signal of a plurality of bits. Thus, the equalization accuracy of the DFE circuit 3 can be improved and the error tolerance for the reception data can be improved, with reducing of increase in the number of taps. Thus, the reception error tolerance can be improved despite the limitation on the performance of the equalizer under the constraints in terms of process, area, and power.

Furthermore, with the present embodiment, an increase in the number of taps (that is, the number of tap circuits connected to the output node of the summer circuit 4) may be suppressed. Thus, the output load of the summer circuit 4 may be small compared with a case where multiple tap circuits are provided, whereby the power consumption of the DFE circuit 3 may easily be reduced.

It should be noted that the pattern to be compared with the predetermined pattern needs not to include the pattern of the earliest (oldest) data signal of the past data signals stored in the shift register 20. For example, the interval of the data that is likely to affect the fluctuation of the tap coefficient $K_1$ may be from the n-interval-prior data signal to the (n+m−p)-interval-prior data signal before the current time point, where p is an integer equal to or larger than 2 and smaller than n+m. In this case, the data signal to be acquired by the control circuit 30 may be the n-interval-prior data signal to the (n+m−p)-interval-prior data signal before the current time point among the past data signals. The shift register 20 may have the later stage part 22, including the n-th to the (n+m−p)-th stages, configured by an SIPO circuit, and may have the earlier stage part 21, including the registers of the first to the (n−1)-th stage and the registers of the (n+m−p+1)-th to the (n+m−1)-th stages configured to simply perform the shift operation and not to perform the output to the pattern comparator 31 of the control circuit 30.

Second Embodiment

Next, a semiconductor integrated circuit according to a second embodiment will be described. The following description will focus on differences from the first embodiment.

In the first embodiment, the tap coefficient is corrected when the pattern of the data signal of a certain predetermined interval in the past matches the predetermined pattern. In the second embodiment, the tap coefficient is corrected when 0/1-probability in the pattern of the data signal of a predetermined interval in the past is included in a probability range. The 0/1-probability refers to the appearance probability of 1, which may be obtained with the following Formula 1.

(0/1-probability)=(Number of '1's included in the pattern of the data signal to be compared)/ (Number of bits of the data signal pattern to be compared)  Formula 1.

Figure 6:
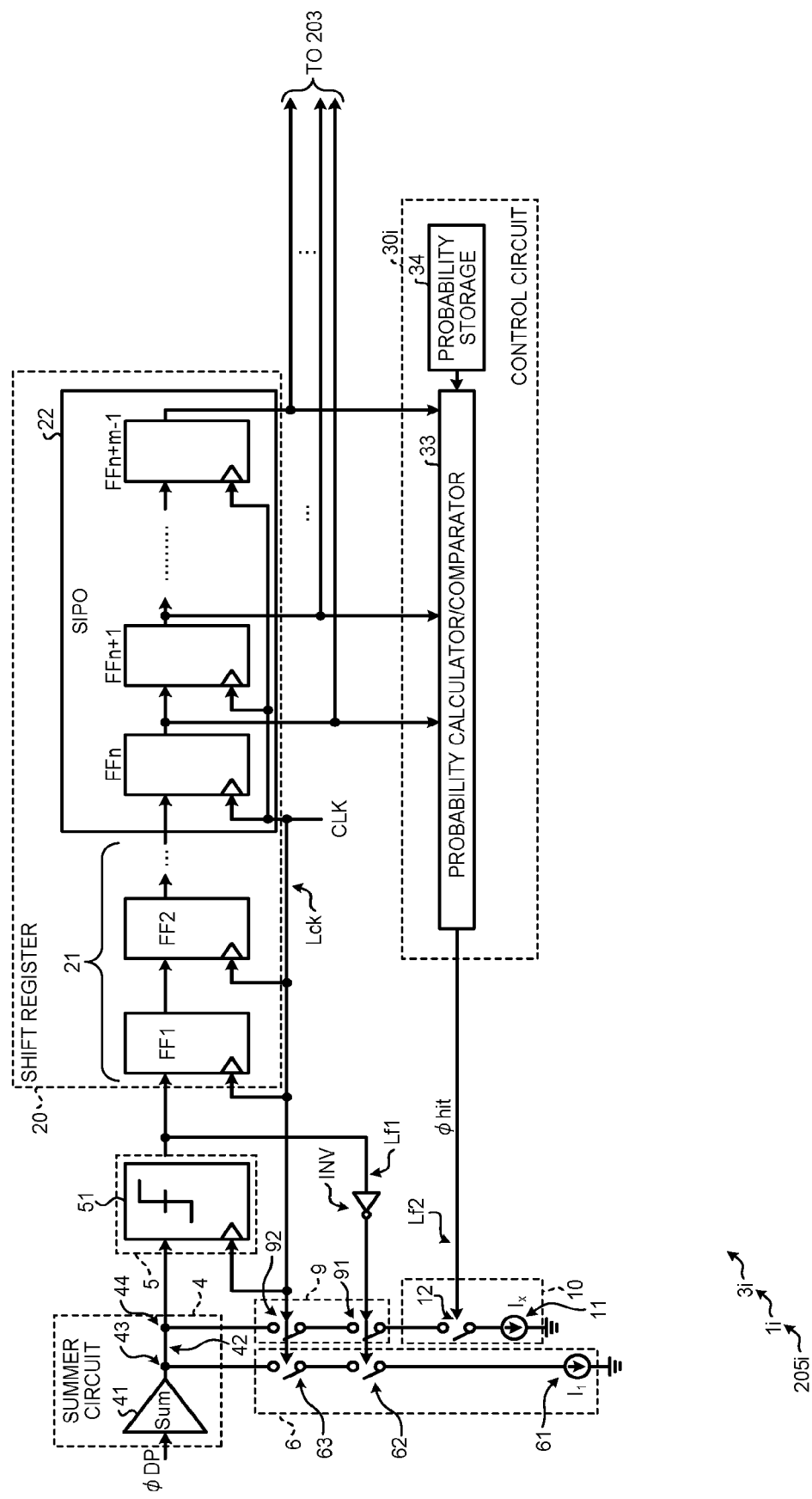
FIG. 6 is a circuit diagram illustrating an example of a configuration of a DFE circuit according to a second embodiment.

Specifically, as illustrated in FIG. 6, an equalization circuit 1*i* of a semiconductor integrated circuit 205*i* has a DFE circuit 3*i* instead of the DFE circuit 3 (see FIG. 4) in the first embodiment. The DFE circuit 3*i* has a control circuit 30*i* instead of the control circuit 30 (see FIG. 4). The control circuit 30*i* receives the n-interval-prior data signal to the (n+m−1)-interval-prior data signal before the current time point among the past data signals, via the plurality of output nodes of the shift register 20. The control circuit 30*i* stores in advance information indicating a range of 0/1-probabilities that are likely to affect the fluctuation of the tap coefficient. The control circuit 30*i* obtains the 0/1-probability in the pattern of the received data signal, and compares the obtained 0/1-probability with the stored probability range. When the probability range includes the obtained 0/1-probability, the control circuit 30*i* asserts the hit signal φhit, and supplies the hit signal φhit to the correction tap circuit 10.

The control circuit 30*i* has a probability calculator/comparator 33 and a probability storage 34. The probability storage 34 stores information indicating the probability range. The probability range is determined in advance as a range of 0/1-probabilities that are likely to affect the fluctuation of the tap coefficient. The probability calculator/comparator 33 receives the n-interval-prior data signal to the (n+m−1)-interval-prior data signal before the current time point among the past data signals, via the plurality of output nodes of the shift register 20, and acquires the probability range by referring to the probability storage 34. The probability calculator/comparator 33 obtains the 0/1-probability in the pattern of the received data signal, and compares the obtained 0/1-probability with the acquired probability range. When the probability range includes the obtained 0/1-probability, the control circuit 30*i* asserts the hit signal φhit.

Note that as in the first embodiment, the correction tap circuit 10 may feed back the correction signal to the output node of the summer circuit 4 via the switch circuit 9 in response to the assertion of the hit signal φhit.

Figure 7:
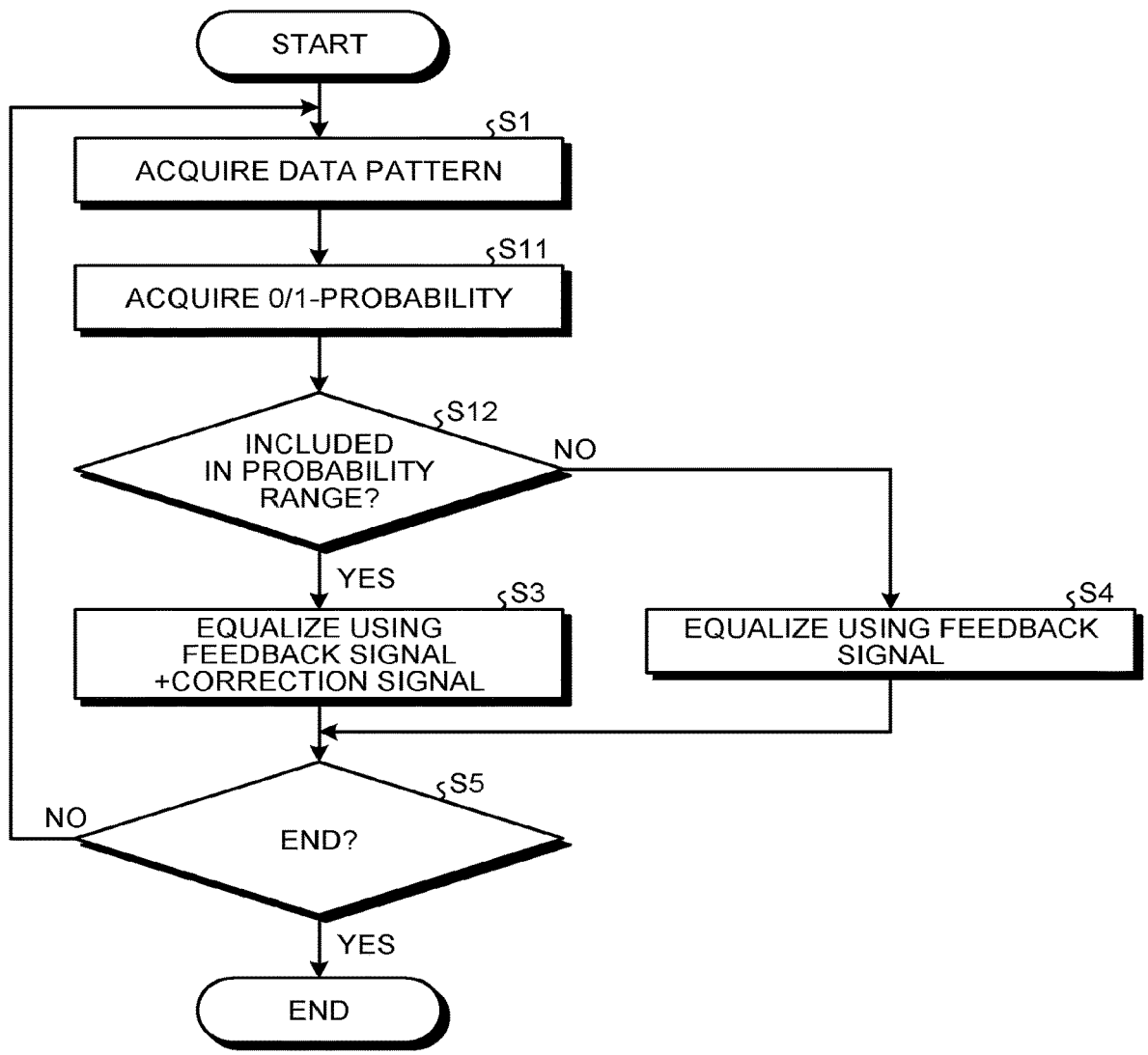
FIG. 7 is a flowchart illustrating an operation of the DFE circuit according to the second embodiment.

Furthermore, as illustrated in FIG. 7, the operation of the DFE 3*i* differs from the operation of the DFE 3 according to the first embodiment in the following points. FIG. 7 is a flowchart illustrating the operation of the DFE 3*i* according to the second embodiment.

After S1, the DFE 3 calculates the 0/1-probability from the acquired data pattern (S11). The DFE 3 compares the calculated 0/1-probability with the probability range stored in advance (S12).

When the calculated 0/1-probability is included in the probability range (Yes in S12), the DFE 3 makes the processing proceed to S3. When the calculated 0/1-probability is not included in the probability range (No in S2), and the DFE 3 makes the processing proceed to S4.

As described above, in the present embodiment, the DFE circuit 3*i* corrects the tap coefficient using a single tap circuit (correction tap circuit 10) when the 0/1-probability in the pattern of the data signal of a certain predetermined interval in the past is included in a probability range determined in advance. Also with this configuration, the number of additional taps may be reduced (for example, to one) with the pattern of the data signal of a plurality of bits checked. Thus, the equalization accuracy of the DFE circuit 3*i* may be improved and the error tolerance for the reception data may be improved, with increase in the number of taps reduced.

Furthermore, with the present embodiment, the increase in the number of taps (that is, the number of tap circuits connected to the output node of the summer circuit 4) may be suppressed. Thus, the output load of the summer circuit 4 may be small compared with a case where multiple tap circuits are added, whereby the power consumption of the DFE circuit 3*i* may easily be reduced.

Third Embodiment

Next, a semiconductor integrated circuit according to a third embodiment will be described. The following description will focus on differences from the first embodiment and the second embodiment.

In the first embodiment, the tap coefficient is corrected any time when the pattern of the data signal of a certain predetermined interval in the past matches the predetermined pattern. In the third embodiment, the tap coefficient is corrected in a given interval, when the pattern of the data signal of a certain predetermined interval in the past matches the predetermined pattern.

Figure 8:
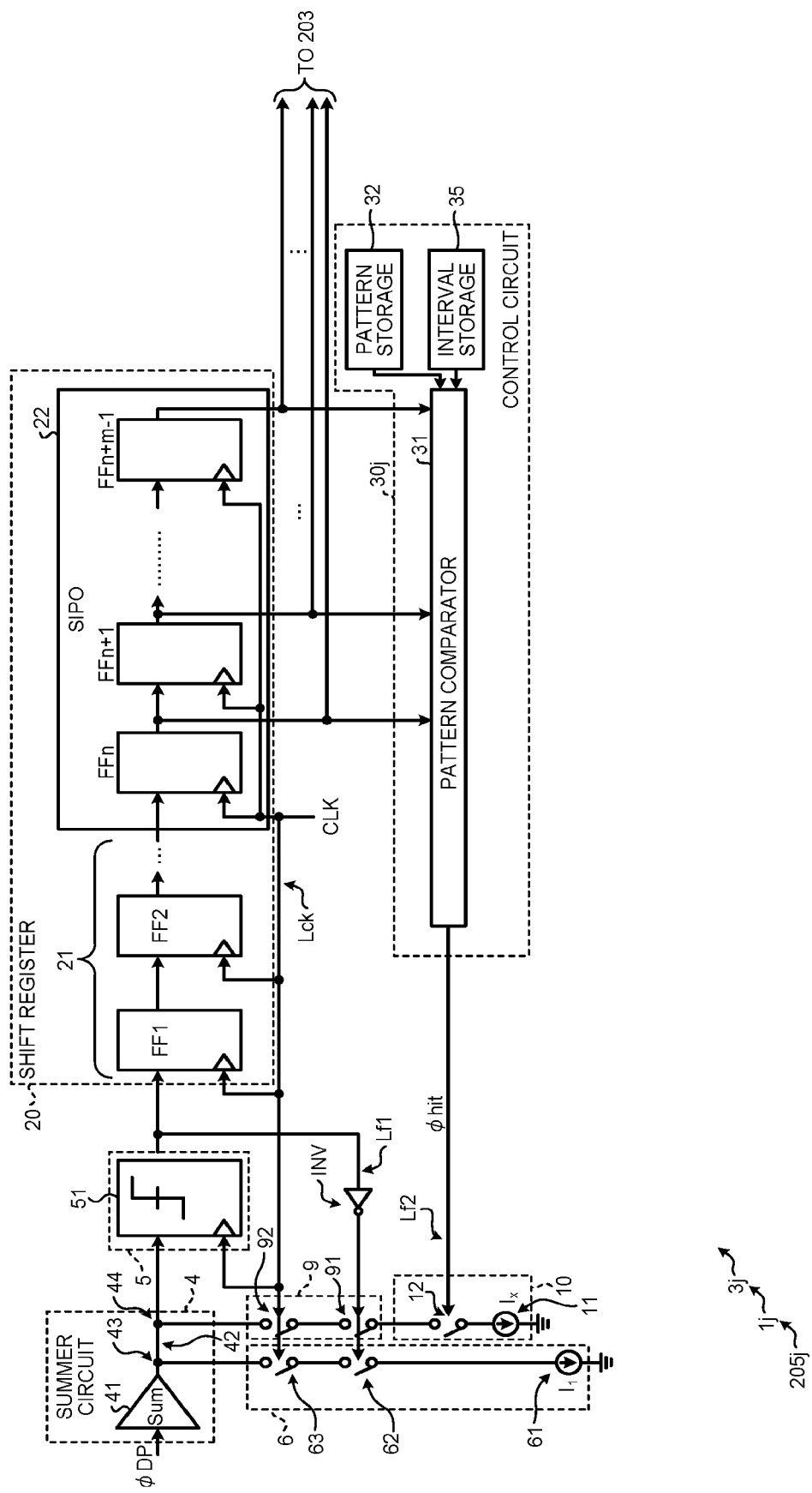
FIG. 8 is a circuit diagram illustrating an example of a configuration of a DFE circuit according to a third embodiment.

Specifically, as illustrated in FIG. 8, an equalization circuit 1*j* of a semiconductor integrated circuit 205*j* has a DFE circuit 3*j* instead of the DFE circuit 3 (see FIG. 4) in the first embodiment. The DFE circuit 3*j* has a control circuit 30j instead of the control circuit 30 (see FIG. 4). The control circuit 30j receives a pattern (data pattern) of the n-interval-prior data signal to the (n+m−1)-interval-prior data signal before the current time point among the past data signals, via the plurality of output nodes of the shift register 20. The control circuit 30j stores in advance the predetermined pattern that is likely to affect the fluctuation of the tap coefficient. The control circuit 30j stores in advance information indicating an interval in which the hit signal φhit is output. The control circuit 30j compares the received data pattern with a predetermined pattern, and when they match, asserts the hit signal φhit and supplies the hit signal φhit to the correction tap circuit 10 in the interval that corresponds to the predetermined pattern and is stored in advance.

The control circuit 30j includes a pattern comparator 31j instead of the pattern comparator 31 (see FIG. 4). The control circuit 30j further includes an interval storage 35. The interval storage 35 stores information indicating the "interval in which the hit signal φhit is output". The "interval in which the hit signal φhit is output" is determined in advance as the interval in which the tap coefficient fluctuates. The pattern comparator 31 receives a pattern (data pattern) of the n-interval-prior data signal to the (n+m−1)-interval-prior data signal before the current time point via the plurality of output nodes of the shift register 20, acquires the predetermined pattern by referring to the pattern storage 32, and acquires the "interval in which the hit signal φhit is output" by referring to the interval storage 35. The pattern comparator 31 compares the received data pattern with the predetermined pattern, and when the received data pattern matches the predetermined pattern, asserts the hit signal φhit in the interval stored in advance. The interval stored in advance is an interval corresponding to the "interval in which the hit signal φhit is output".

As described above, in the present embodiment, in the DFE circuit 3j, when the pattern of the data signal in a certain predetermined interval in the past matches the predetermined pattern, the tap coefficient is corrected in the interval held in advance. This enables highly accurate equalization in the DFE circuit 3j.

Fourth Embodiment

Next, a semiconductor integrated circuit according to a fourth embodiment will be described. The following description will focus on differences from the first embodiment to the third embodiment.

In the second embodiment, the tap coefficient is corrected any time when the 0/1-probability in the pattern of the data signal of a certain predetermined interval in the past is included in the probability range. In the fourth embodiment, the tap coefficient is corrected in a given interval when 0/1-probability in the pattern of the data signal of a predetermined interval in the past is included in a probability range.

Figure 9:
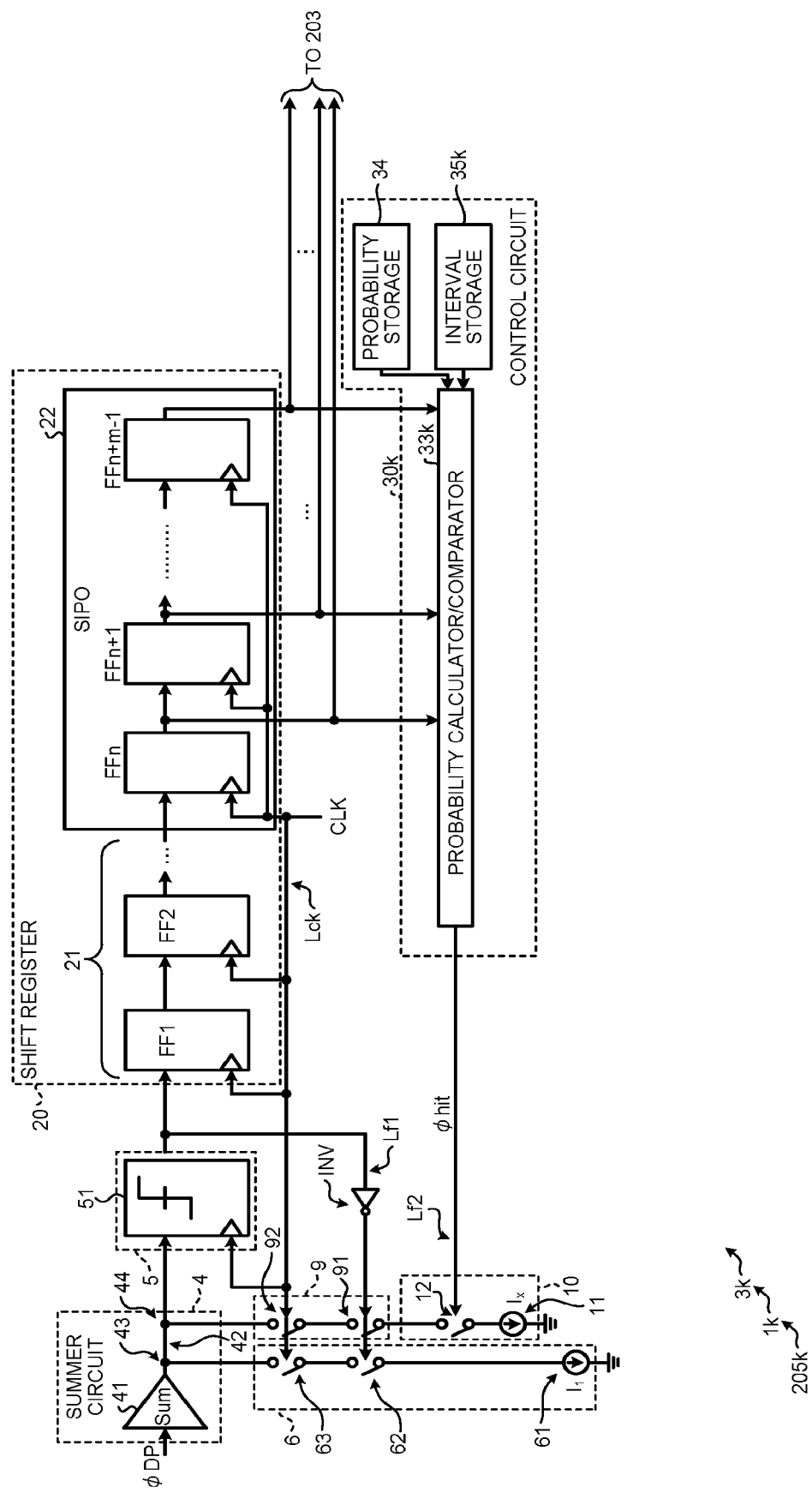
FIG. 9 is a circuit diagram illustrating an example of a configuration of a DFE circuit according to a fourth embodiment.

Specifically, as illustrated in FIG. 9, an equalization circuit 1k of a semiconductor integrated circuit 205k has a DFE circuit 3k instead of the DFE circuit 3i (see FIG. 6) in the second embodiment. The DFE circuit 3k has a control circuit 30k instead of the control circuit 30i (see FIG. 6). The control circuit 30k receives a pattern (data pattern) of the n-interval-prior data signal to the (n+m−1)-interval-prior data signal before the current time point among the past data signals, via the plurality of output nodes of the shift register 20. The control circuit 30k stores in advance information indicating a range of 0/1-probabilities that are likely to affect the fluctuation of the tap coefficient. The control circuit 30k stores in advance information indicating an interval in which the hit signal φhit is output. The control circuit 30k obtains the 0/1-probability in the pattern of the received data signal, and compares the obtained 0/1-probability with the stored probability range. When the probability range includes the obtained 0/1-probability, the control circuit 30k asserts the hit signal φhit, and supplies the hit signal φhit to the correction tap circuit 10 in an interval that is stored in advance and corresponds to the probability range.

The control circuit 30k includes a probability calculator/comparator 33k instead of the probability calculator/comparator 33 (see FIG. 6). The control circuit 30k further includes an interval storage 35k. The interval storage 35k stores information indicating the "interval in which the hit signal φhit is output". The "interval in which the hit signal φhit is output" is determined in advance as the interval in which the tap coefficient fluctuates. The probability calculator/comparator 33k receives a pattern (data pattern) of the n-interval-prior data signal to the (n+m−1)-interval-prior data signal before the current time point via the plurality of output nodes of the shift register 20, acquires the probability range by referring to the probability storage 34, and acquires the "interval in which the hit signal φhit is output" by referring to the interval storage 35k. The probability calculator/comparator 33k obtains the 0/1-probability in the pattern of the received data signal, and compares the obtained 0/1-probability with the acquired probability range. When the probability range includes the obtained 0/1-probability, the control circuit 30k asserts the hit signal φhit in the interval stored in advance. The interval stored in advance is an interval corresponding to the "interval in which the hit signal φhit is output".

As described above, in the present embodiment, in the DFE circuit 3k, when the 0/1-probability in the pattern of the data signal in a certain predetermined interval in the past is included in the probability range, the tap coefficient is corrected in the interval held in advance. This enables highly accurate equalization in the DFE circuit 3k.

Fifth Embodiment

Next, a semiconductor integrated circuit according to a fifth embodiment will be described. The following description will focus on differences from the first embodiment to the fourth embodiment.

In the third embodiment, the tap coefficient is corrected when the pattern of the data signal of a certain predetermined interval in the past matches one predetermined pattern. In the fifth embodiment, the tap coefficient is corrected by switching between the correction tap coefficients, when the pattern of the data signal of a predetermined interval in the past matches any one of a plurality of the predetermined pattern.

Figure 10:
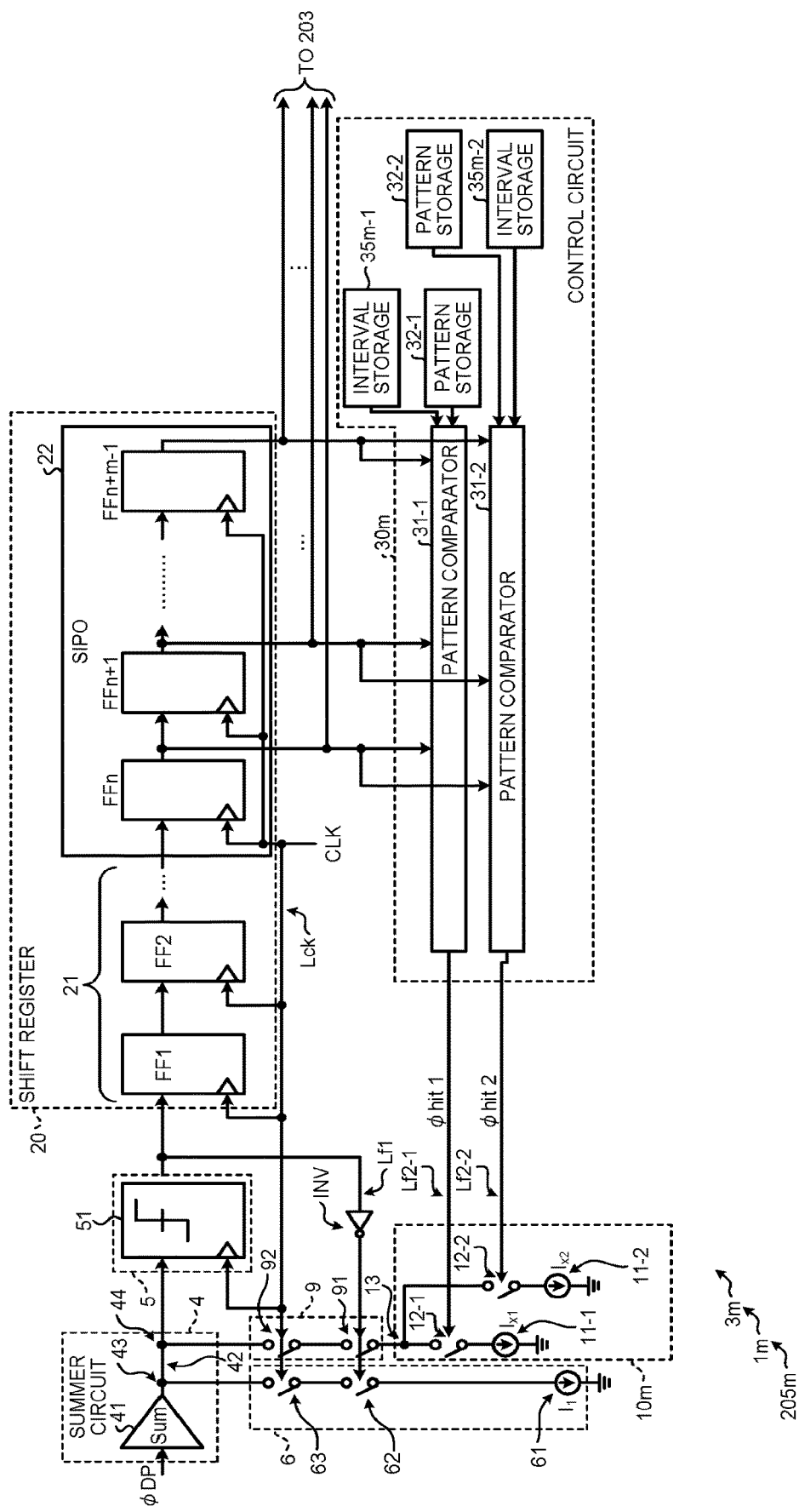
FIG. 10 is a circuit diagram illustrating an example of a configuration of a DFE circuit according to a fifth embodiment.

Specifically, as illustrated in FIG. 10, an equalization circuit 1m of a semiconductor integrated circuit 205m has a DFE circuit 3m instead of the DFE circuit 3j (see FIG. 8) in the third embodiment. The DFE circuit 3m includes a correction tap circuit 10m and a control circuit 30m instead of the correction tap circuit 10 and the control circuit 30j (see FIG. 8) in the third embodiment. The control circuit 30m receives a pattern (data pattern) of the n-interval-prior data signal to the (n+m−1)-interval-prior data signal before the current time point among the past data signals, via the plurality of output nodes of the shift register 20. The control circuit 30m stores in advance a plurality of predetermined patterns that are likely to affect the fluctuation of the tap coefficient. The control circuit 30m stores in advance an interval in which a plurality of hit signal φhit1 or hit signal φhit2 are output according to a plurality of predetermined patterns. The control circuit 30m compares the received data pattern with a plurality of predetermined patterns, and when the comparison results match, asserts the hit signal φhit1 or the hit signal φhit2 in the interval that corresponds to the plurality of predetermined patterns and is stored in advance, and supplies the hit signal φhit1 or the hit signal φhit2 to the correction tap circuit 10m.

The control circuit 30m includes a plurality of pattern comparators 31-1 and 31-2, a plurality of pattern storages 32-1 and 32-2, and interval storages 35m-1 and 35m-2.

The pattern comparator 31-1 receives a pattern (data pattern) of the n-interval-prior data signal to the (n+m−1)-interval-prior data signal before the current time point via the plurality of output nodes of the shift register 20, and acquires the "interval in which the hit signal φhit1 is output" by referring to the interval storage 35m-1. Furthermore, a first predetermined pattern is acquired by referring to the pattern storage 32-1. The pattern comparator 31-1 compares the received data pattern with the first predetermined pattern, and when the comparison results match, asserts the hit signal φhit1 and outputs the hit signal φhit1 to a feedback line Lf2-1 in the interval that is stored in advance and corresponds to the first predetermined pattern. The interval stored in advance is an interval corresponding to the "interval in which the hit signal φhit1 is output".

The pattern comparator 31-2 receives a pattern (data pattern) of the n-interval-prior data signal to the (n+m−1)-interval-prior data signal before the current time point via the plurality of output nodes of the shift register 20, and acquires the "interval in which the hit signal φhit2 is output" by referring to the interval storage 35m-2. Furthermore, a second predetermined pattern is acquired by referring to the pattern storage 32-2. The pattern comparator 31-2 compares the received data pattern with the second predetermined pattern, and when the comparison results match, asserts the hit signal φhit2 and outputs the hit signal φhit2 to a feedback line Lf2-2 in the interval that is stored in advance and corresponds to the second predetermined pattern. The interval stored in advance is an interval corresponding to the "interval in which the hit signal φhit2 is output".

The correction tap circuit 10m includes a plurality of current sources 11-1 and 11-2, a plurality of switches 12-1 and 12-2, and a connection node 13. In the correction tap circuit 10m, the feedback line Lf2-1 is connected to a control node of the switch 12-1 and the feedback line Lf2-2 is connected to a control node of the switch 12-2. Each of the plurality of switches 12-1 and 12-2 is connected to the switch circuit 9 via the connection node 13.

The switch 12-1 is provided between the connection node 13 and the current source 11-1. The switch circuit 9 and the current source 11-1 may be electrically connected to each other when the switch 12-1 is turned ON in response to the assertion of the hit signal φhit1. The switch 12-1 may comprise an NMOS transistor. This hit signal φhit1 may be a high active signal. Further, a current $Ix_1$ that is supplied from the current source 11-1 is determined in advance based on a correction tap coefficient ΔK-1.

The switch 12-2 is provided between the connection node 13 and the current source 11-2. The switch circuit 9 and the current source 11-2 may be electrically connected to each other when the switch 12-2 is turned ON in response to the assertion of the hit signal φhit2. The switch 12-2 may comprise an NMOS transistor. This hit signal φhit2 may be a high active signal. Further, a current $Ix_2$ that is supplied from the current source 11-2 is determined in advance based on a correction tap coefficient ΔK-2.

As described above, in the present embodiment, in the DFE circuit 3m, the tap coefficient $K_1$ is corrected while switching between the correction tap coefficients ΔK-1 and ΔK-2 when the pattern of the data signal of a certain predetermined interval in the past matches any of the plurality of predetermined patterns. This enables highly accurate equalization in the DFE circuit 3m.

Sixth Embodiment

Next, a semiconductor integrated circuit according to a sixth embodiment will be described. The following description will focus on differences from the first embodiment to the fifth embodiment.

In the fourth embodiment, the tap coefficient is corrected when the 0/1-probability in the pattern of the data signal of a certain predetermined interval in the past is included in one probability range. In the sixth embodiment, the tap coefficient is switching while switching between correction tap coefficients when the 0/1-probability in the pattern of the data signal of a certain predetermined interval in the past is included in any of a plurality of probability ranges.

Figure 11:
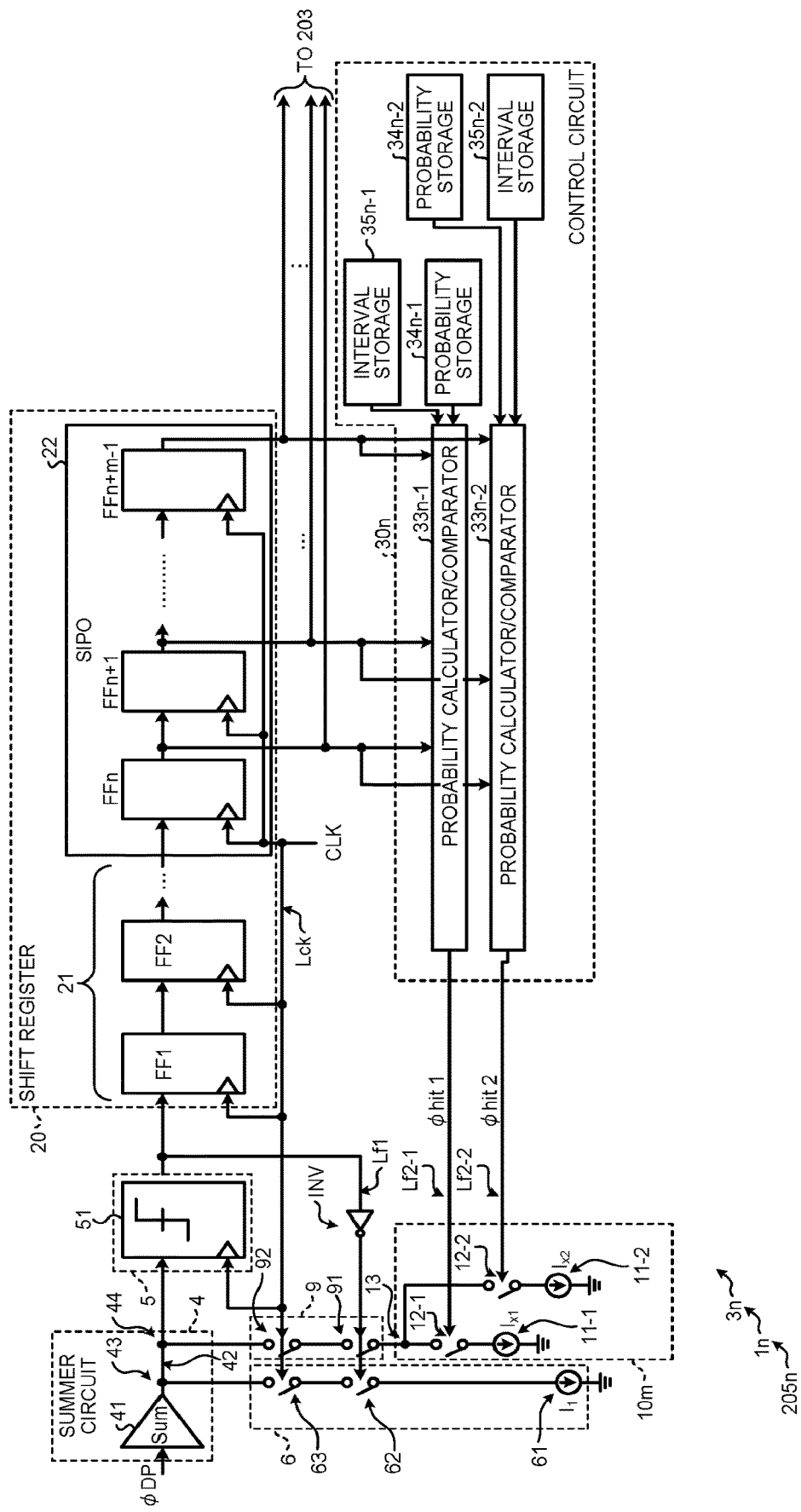
FIG. 11 is a circuit diagram illustrating an example of a configuration of a DFE circuit according to a sixth embodiment.

Specifically, as illustrated in FIG. 11, an equalization circuit 1n of a semiconductor integrated circuit 205n has a DFE circuit 3n instead of the DFE circuit 3k (see FIG. 9) in the fourth embodiment. The DFE circuit 3n includes a correction tap circuit 10m and a control circuit 30n instead of the correction tap circuit 10 and the control circuit 30k (see FIG. 9) in the fourth embodiment. The control circuit 30n receives a pattern (data pattern) of the n-interval-prior data signal to the (n+m−1)-interval-prior data signal before the current time point among the past data signals, via the plurality of output nodes of the shift register 20. The control circuit 30n stores in advance a range of 0/1-probabilities that are likely to affect the fluctuation of the tap coefficient. The control circuit 30n stores in advance a plurality of intervals in which the hit signal φhit1 or the hit signal φhit2 are output. In the plurality of intervals in which the hit signal φhit1 or the hit signal φhit2 is output, the control circuit 30n obtains the 0/1-probability in the pattern of the received data signal, and compares the obtained 0/1-probability with the plurality of probability ranges. When any of the probability ranges includes the obtained 0/1-probability, the control circuit 30n asserts the hit signal φhit1 or the hit signal φhit2, and supplies the hit signal φhit1 or the hit signal φhit2 to the correction tap circuit 10m in an interval that is stored in advance and corresponds to the plurality of probability ranges.

The control circuit 30n has a plurality of probability calculators/comparators 33n-1 and 33n-2, a plurality of probability storages 34n-1 and 34n-2, and a plurality of interval storages 35n-1 and 35n-2.

The probability calculator/comparator 33n-1 receives a pattern (data pattern) of the n-interval-prior data signal to the (n+m−1)-interval-prior data signal before the current time point via the plurality of output nodes of the shift register 20, and acquires the "interval in which the hit signal φhit1 is output" by referring to the interval storage 35n-1. Furthermore, a first probability range is acquired by referring to the probability storage 34n-1. The probability calculator/comparator 33n-1 obtains the 0/1-probability in the pattern of the received data signal, and compares the obtained 0/1-probability with the first probability range. When the first probability range includes the obtained 0/1-probability, the probability calculator/comparator 33n-1 asserts the hit signal ϕhit1, and supplies the hit signal ϕhit1 to the feedback line Lf2-1 in an interval that is stored in advance and corresponds to the first probability range. The interval stored in advance is an interval corresponding to the "interval in which the hit signal ϕhit1 is output".

The probability calculator/comparator 33n-2 receives a pattern (data pattern) of the n-interval-prior data signal to the (n+m−1)-interval-prior data signal before the current time point via the plurality of output nodes of the shift register 20, and acquires the "interval in which the hit signal ϕhit2 is output" by referring to the interval storage 35n-2. Furthermore, a second probability range is acquired by referring to the probability storage 34n-2. The probability calculator/comparator 33n-2 obtains the 0/1-probability in the pattern of the received data signal, and compares the obtained 0/1-probability with the second probability range. When the second probability range includes the obtained 0/1-probability, the probability calculator/comparator 33n-2 asserts the hit signal ϕhit2, and supplies the hit signal ϕhit2 to the feedback line Lf2-2 in an interval that is stored in advance and corresponds to the second probability range. The interval stored in advance is an interval corresponding to the "interval in which the hit signal ϕhit2 is output".

The configuration and operation of the correction tap circuit 10m are the same as those in the fifth embodiment.

As described above, in the present embodiment, in the DFE circuit 3n, the tap coefficient $K_1$ is corrected while switching between the correction tap coefficients ΔK-1 and ΔK-2 when the 0/1-probability in the pattern of the data signal of a certain predetermined interval in the past matches any of the plurality of probability ranges. This enables highly accurate equalization in the DFE circuit 3n.

Seventh Embodiment

Next, a semiconductor integrated circuit according to a seventh embodiment will be described. The following description will focus on differences from the first embodiment to the sixth embodiment.

In the third embodiment, the correction tap coefficient is set in advance in the correction tap circuit. In the seventh embodiment, the correction tap coefficient is adjusted.

Figure 12:
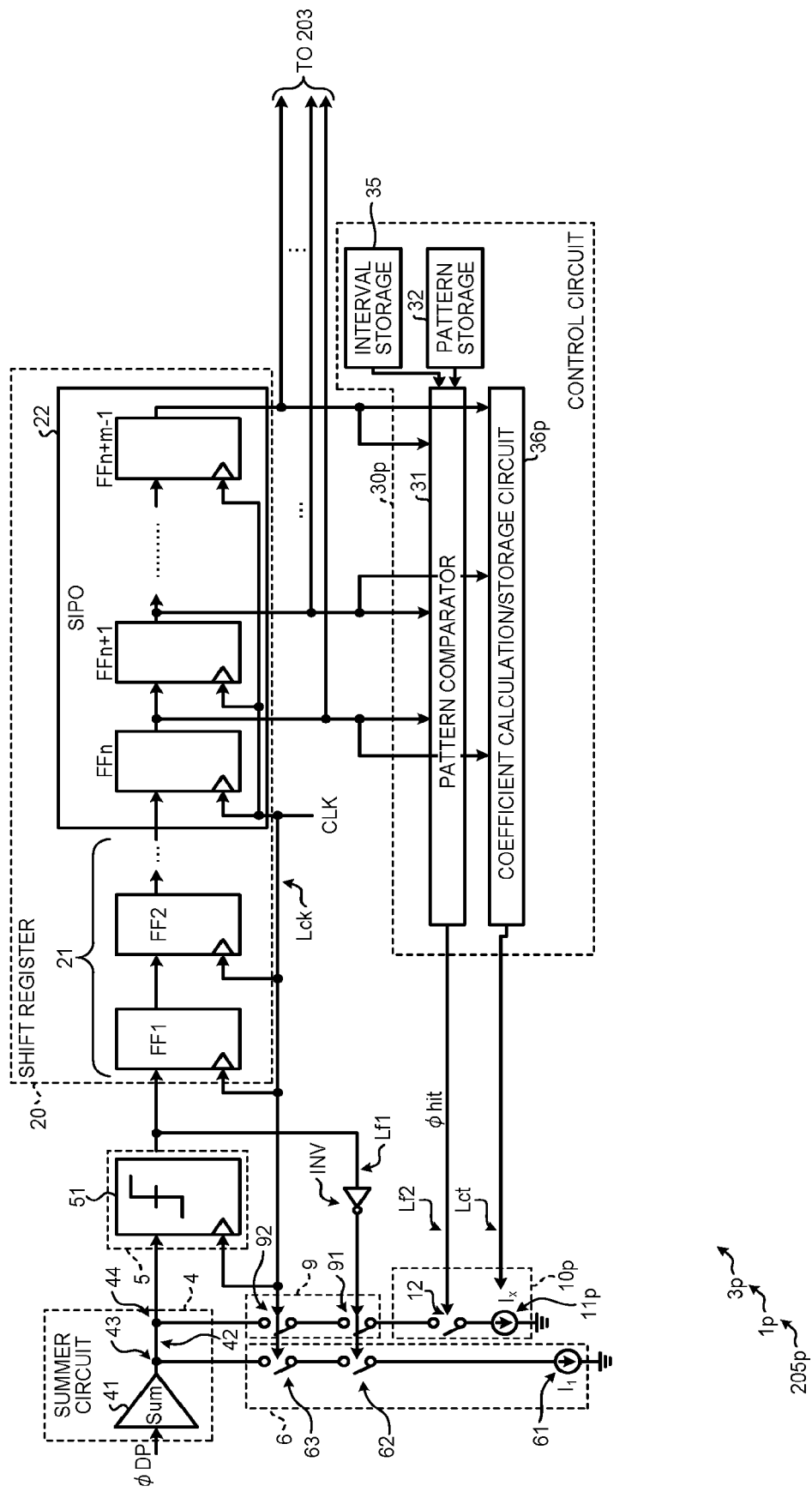
FIG. 12 is a circuit diagram illustrating an example of a configuration of a DFE circuit according to a seventh embodiment.

Specifically, as illustrated in FIG. 12, an equalization circuit 1p of a semiconductor integrated circuit 205p has a DFE circuit 3p instead of the DFE circuit 3j (see FIG. 8) in the third embodiment. The DFE circuit 3p includes a correction tap circuit 10p and a control circuit 30p instead of the correction tap circuit 10 and the control circuit 30j (see FIG. 8) in the third embodiment. The control circuit 30p receives a pattern (data pattern) of the n-interval-prior data signal to the (n+m−1)-interval-prior data signal before the current time point among the past data signals, via the plurality of output nodes of the shift register 20. The control circuit 30p obtains and stores a control value for achieving an appropriate current value Ix based on the predetermined pattern, and outputs the control value to a control line Lct.

The control circuit 30p further includes a coefficient calculation/storage circuit 36p. The coefficient calculation/storage circuit 36p calculates an appropriate tap coefficient that is an appropriate value of the tap coefficient based on the data pattern that matches the predetermined pattern, by performing LMS operation on the data pattern. The coefficient calculation/storage circuit 36p obtains the control value for achieving the appropriate current value lx based on the appropriate tap coefficient, stores the control value, and outputs the control value to the control line Lct.

The correction tap circuit 10p has a variable current source 11p instead of the current source 11 (see FIG. 8). In the correction tap circuit 10p, the control line Lct is connected to a control node of the variable current source 11p. The variable current source 11p receives the control value for the current value Ix from the control circuit 30p (coefficient calculation/storage circuit 36p) through the control line Lct at the control node, and supplies the current value Ix based on the control value. The current Ix supplied by the variable current source 11p is adjusted to a value corresponding to the correction tap coefficient ΔK based on the current state of the wired communication path 300 and the operating environment.

As described above, in the present embodiment, the correction tap coefficient is dynamically adjusted in the DFE circuit 3p, so that the correction tap coefficient can be optimized to a value based on the state of the wired communication path 300 or the operating environment.

Eighth Embodiment

Next, a semiconductor integrated circuit according to an eighth embodiment will be described. The following description will focus on differences from the first embodiment to the seventh embodiment.

In the fourth embodiment, the correction tap coefficient is set in advance in the correction tap circuit. In the eighth embodiment, the correction tap coefficient is adjusted.

Figure 13:
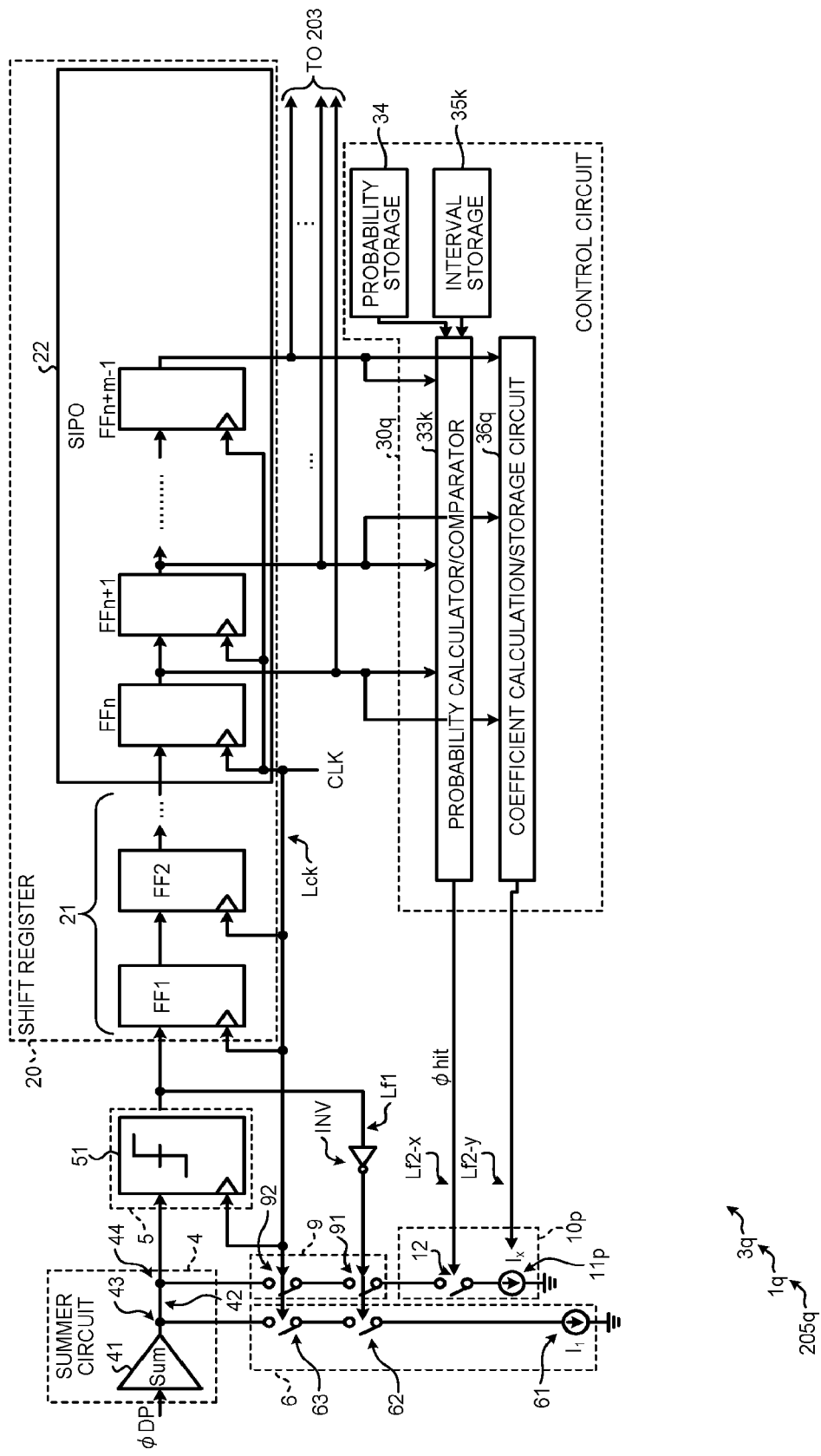
FIG. 13 is a circuit diagram illustrating an example of a configuration of a DFE circuit according to an eighth embodiment.

Specifically, as illustrated in FIG. 13, an equalization circuit 1q of a semiconductor integrated circuit 205q has a DFE circuit 3q instead of the DFE circuit 3k (see FIG. 9) in the fourth embodiment. The DFE circuit 3q includes a correction tap circuit 10p and a control circuit 30q instead of the correction tap circuit 10 and the control circuit 30k (see FIG. 9). The control circuit 30q receives a pattern (data pattern) of the n-interval-prior data signal to the (n+m−1)-interval-prior data signal before the current time point among the past data signals, via the plurality of output nodes of the shift register 20. The control circuit 30q obtains and stores a control value for achieving an appropriate current value Ix based on the probability range, and outputs the control value to a control line Lct.

The control circuit 30q further includes a coefficient calculation/storage circuit 36q. The coefficient calculation/storage circuit 36q calculates an appropriate tap coefficient that is an appropriate value of the tap coefficient based on the data pattern with the 0/1-probability included in the probability range, by performing LMS operation on the data pattern. The coefficient calculation/storage circuit 36q obtains the control value for achieving the appropriate current value lx based on the appropriate tap coefficient, stores the control value, and outputs the control value to the control line Lct.

The configuration and operation of the correction tap circuit 10p are the same as those in the seventh embodiment.

As described above, in the present embodiment, the correction tap coefficient is dynamically adjusted in the DFE circuit 3q, so that the correction tap coefficient can be optimized to a value based on the state of the wired communication path 300 or the operating environment.

Ninth Embodiment

Next, a semiconductor integrated circuit according to a ninth embodiment will be described. The following description will focus on differences from the first embodiment to the eighth embodiment.

In the third embodiment, the tap coefficient is corrected when the pattern of the data signal of one predetermined interval matches the predetermined pattern. In the ninth embodiment, the tap coefficient is corrected when the pattern of the data signal of a plurality of different predetermined intervals matches the predetermined pattern.

Figure 14:
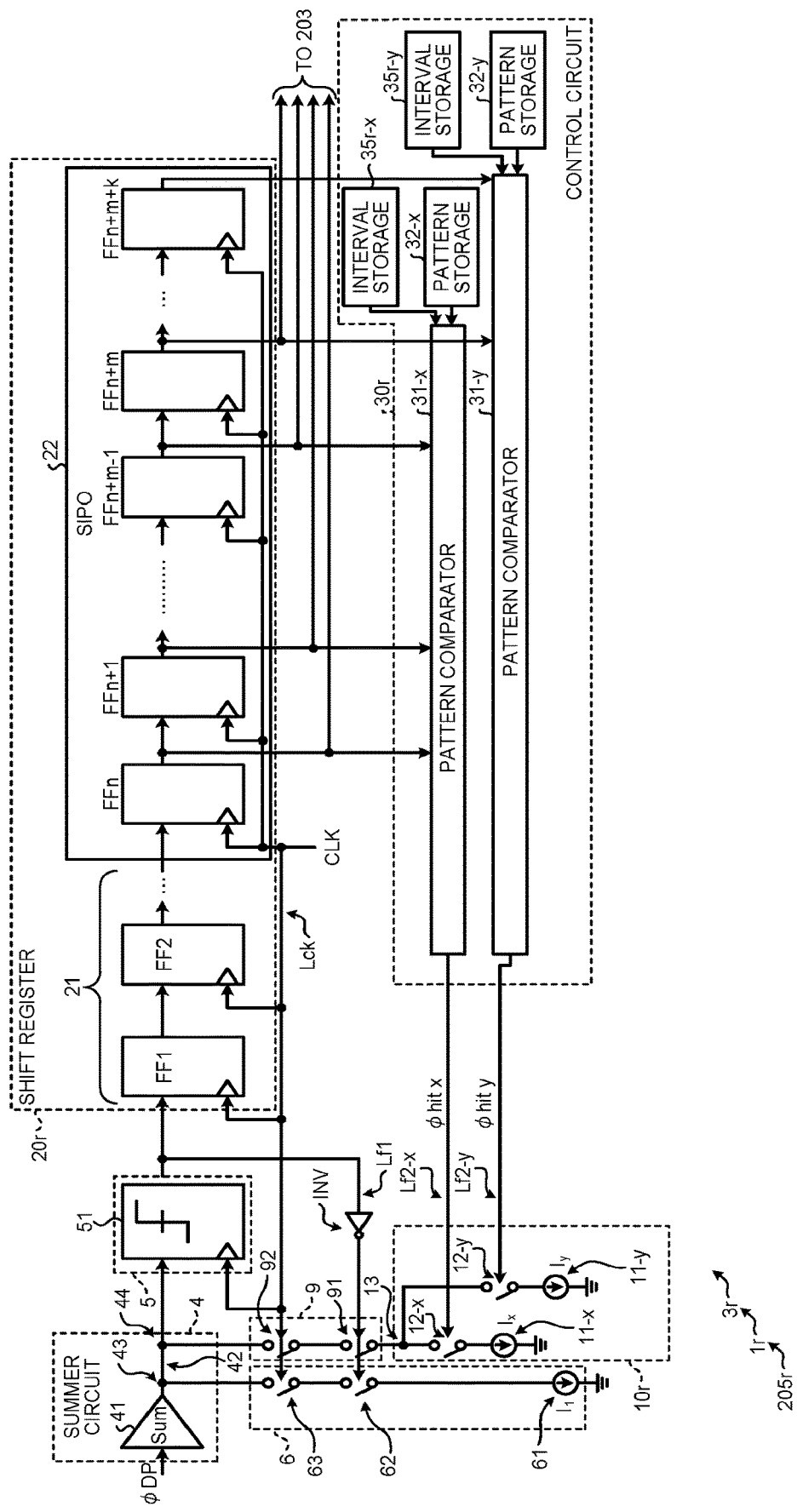
FIG. 14 is a circuit diagram illustrating an example of a configuration of a DFE circuit according to a ninth embodiment.

Specifically, as illustrated in FIG. 14, an equalization circuit $1r$ of a semiconductor integrated circuit $205r$ has a DFE circuit $3r$ instead of the DFE circuit $3j$ (see FIG. 8) in the third embodiment. The DFE circuit $3r$ includes a correction tap circuit $10r$, a shift register $20r$, and a control circuit $30r$ instead of the correction tap circuit 10, the shift register 20, and the control circuit $30j$ (see FIG. 8). The configuration and the operation of the correction tap circuit $10r$ are similar to those of the correction tap circuit $10m$ (see FIG. 10). The shift register $20r$ includes n+m+k stages of registers, where k is any integer that is equal to or larger than 2. In the shift register $20r$, the output nodes of registers of the n-th to (n+m+k)-th stages are connected to each of the control circuit $30r$ and the internal circuit 203 as a plurality of output nodes of the shift register $20r$. The control circuit $30r$ receives a pattern (first data pattern) of the n-interval-prior data signal to the (n+m−1)-interval-prior data signal before the current point among the past data signals, and receives a pattern (second data pattern) of the (n+m)-interval-prior data signal to the (n+m+k)-interval-prior data signal before the current point among the past data signals, via a plurality of output nodes of the shift register $20r$.

The control circuit $30r$ stores in advance each of the first predetermined pattern and the interval in which a hit signal ϕhitx is output. The control circuit $30r$ compares the received first data pattern with the first predetermined pattern, and when the comparison results match, asserts the hit signal ϕhitx and supplies the hit signal ϕhitx to the correction tap circuit $10r$ in the interval that corresponds to the first predetermined pattern and is stored in advance.

The control circuit $30r$ stores in advance each of the second predetermined pattern and the interval in which a hit signal ϕhity is output. The control circuit $30r$ compares the received second data pattern with the second predetermined patterns, and when the comparison results match, asserts the hit signal ϕhity and supplies the hit signal ϕhity to the correction tap circuit $10r$ in the interval that corresponds to the second predetermined pattern and is stored in advance.

The control circuit $30r$ includes a plurality of pattern comparators $31$-$x$ and $31$-$y$, a plurality of pattern storages $32$-$x$ and $32$-$y$, and a plurality of interval storages $35r$-$x$ and $35r$-$y$. The pattern comparator $31$-$x$ is connected with output nodes of registers of the n-th to (n+m−1)-th stages of the shift register $20r$. The pattern comparator $31$-$y$ is connected with output nodes of registers of the (n+m)-th to (n+m+k)-th stages of the shift register $20r$.

The pattern comparator $31$-$x$ receives a pattern (first data pattern) of the n-interval-prior data signal to the (n+m−1)-interval-prior data signal before the current time point, and acquires the "interval in which the hit signal ϕhitx is output" by referring to the interval storage $35r$-$x$. The interval storage $35r$-$x$ stores the "interval in which the hit signal ϕhitx is output". Furthermore, the pattern comparator $31$-$x$ acquires the first predetermined pattern by referring to the pattern storage $32$-$x$. The pattern storage $32$-$x$ stores the first predetermined pattern. The pattern comparator $31$-$x$ compares the received first data pattern with the first predetermined pattern, and when the first data pattern matches the first predetermined pattern, asserts the hit signal ϕhitx and outputs the hit signal ϕhitx to a feedback line Lf2-$x$ in the interval that is stored in advance and corresponds to the first predetermined pattern. The interval stored in advance is an interval corresponding to the "interval in which the hit signal ϕhitx is output".

The pattern comparator $31$-$y$ receives a pattern (second data pattern) of the (n+m)-interval-prior data signal to the (n+m+k)-interval-prior data signal before the current time point, and acquires the "interval in which the hit signal ϕhity is output" by referring to the interval storage $35r$-$y$. The interval storage $35r$-$y$ stores the "interval in which the hit signal ϕhity is output". The pattern comparator $31$-$y$ refers to the pattern storage $32$-$y$ to obtain the second predetermined pattern. The pattern storage $32$-$y$ stores the second predetermined pattern. The pattern comparator $31$-$y$ compares the received second data pattern with the second predetermined pattern, and when the second data pattern matches the second predetermined pattern, asserts the hit signal ϕhity and outputs the hit signal ϕhity to a feedback line Lf2-$y$ in the interval that is stored in advance and corresponds to the second predetermined pattern. The interval stored in advance is an interval corresponding to the "interval in which the hit signal ϕhity is output".

The correction tap circuit $10r$ includes a plurality of current sources $11$-$x$ and $11$-$y$, a plurality of switches $12$-$x$ and $12$-$y$, and the connection node 13. In the correction tap circuit $10r$, the feedback line Lf2-$x$ is connected to a control node of the switch $12$-$x$ and the feedback line Lf2-$y$ is connected to a control node of the switch $12$-$y$. Each of the plurality of switches $12$-$x$ and $12$-$y$ is connected to the switch circuit 9 via the connection node 13.

The switch $12$-$x$ is provided between the connection node 13 and the current source $11$-$x$. The switch circuit 9 and the current source $11$-$x$ may be electrically connected to each other when the switch $12$-$x$ is turned ON in response to the assertion of the hit signal ϕhitx. The switch $12$-$x$ may comprise an NMOS transistor. This hit signal ϕhitx may be a high active signal. Further, a current Ix that is supplied from the current source $11$-$x$ is determined in advance based on a correction tap coefficient ΔK-x.

The switch $12$-$y$ is provided between the connection node 13 and the current source $11$-$y$. The switch circuit 9 and the current source $11$-$y$ may be electrically connected to each other when the switch $12$-$y$ is turned ON in response to the assertion of the hit signal ϕhity. The switch $12$-$y$ may comprise an NMOS transistor. This hit signal ϕhity may be a high active signal. Further, a current Ix that is supplied from the current source $11$-$y$ is determined in advance based on a correction tap coefficient ΔK-y.

As described above, in the present embodiment, in the DFE circuit $3r$, the tap coefficient is corrected while switching between the correction tap coefficients when the pattern of the data signals of a plurality of different predetermined intervals matches the predetermined pattern. With this configuration, correction may be performed for influence from each of the plurality of different predetermined intervals, whereby equalization accuracy may further be improved.

Tenth Embodiment

Next, a semiconductor integrated circuit according to a tenth embodiment will be described. The following description will focus on differences from the first embodiment to the ninth embodiment.

In the fourth embodiment, the tap coefficient is corrected when 0/1-probability in the pattern of the data signal of one predetermined interval is included in the probability range. In the tenth embodiment, the tap coefficient is corrected when 0/1-probability in the pattern of the data signals of a plurality of different predetermined intervals is included in the probability range.

Figure 15:
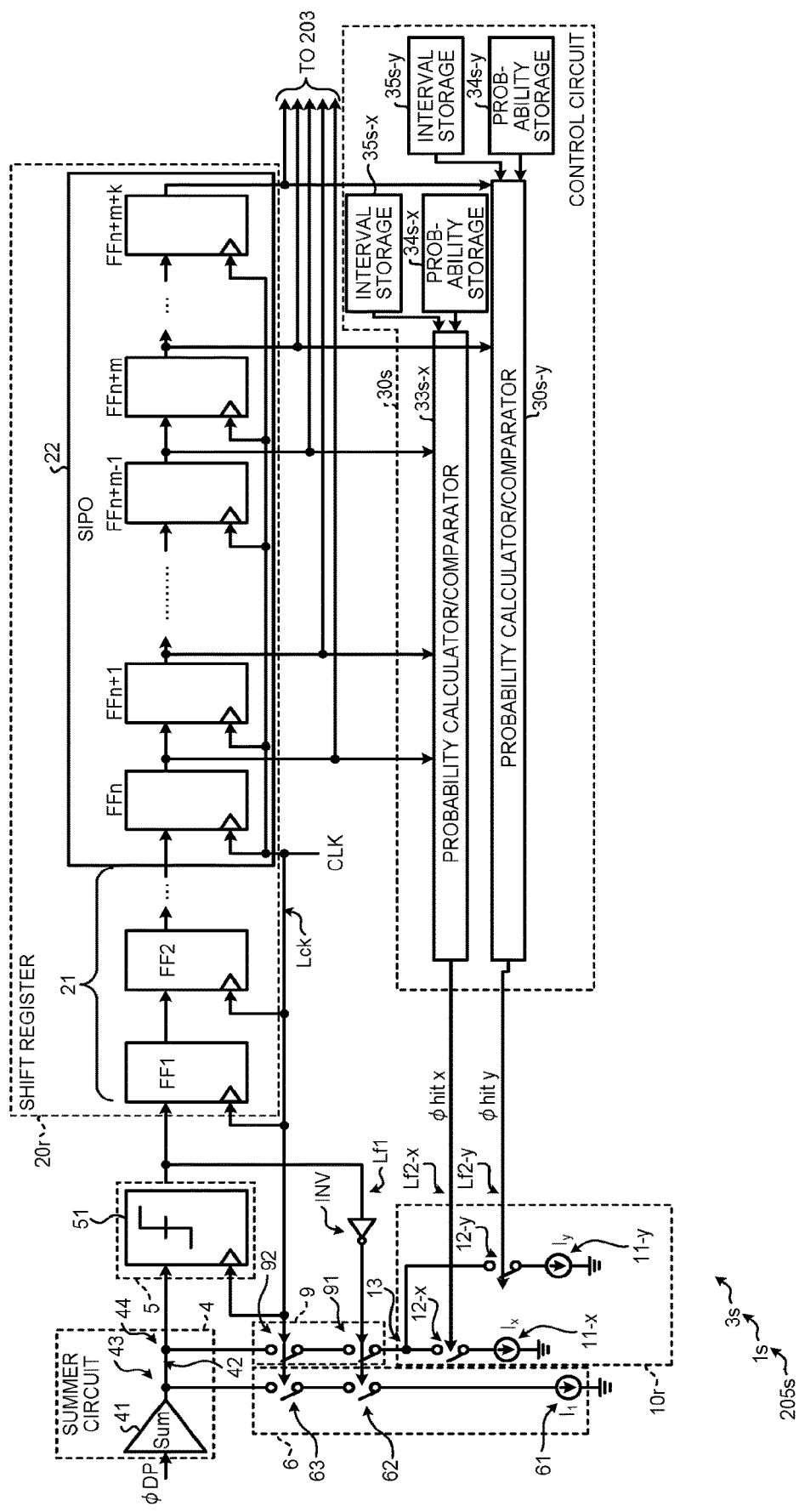
FIG. 15 is a circuit diagram illustrating an example of a configuration of a DFE circuit according to a tenth embodiment.

Specifically, as illustrated in FIG. 15, an equalization circuit is of a semiconductor integrated circuit 205s has a DFE circuit 3s instead of the DFE circuit 3k (see FIG. 9) in the fourth embodiment. The DFE circuit 3s includes a correction tap circuit 10r, a shift register 20r, and a control circuit 30s instead of the correction tap circuit 10, the shift register 20, and the control circuit 30k (see FIG. 9). The shift register 20r includes n+m+k stages of registers, where k is any integer that is equal to or larger than 2. The shift register 20r is similar to that in the ninth embodiment. The control circuit 30s receives a pattern (first data pattern) of n-interval-prior data signal to (n+m−1)-interval-prior data signal before the current point among the past data signals, and receives a pattern (second data pattern) of the (n+m)-interval-prior data signal to the (n+m+k)-interval-prior data signal before the current point among the past data signals, via the plurality of output nodes of the shift register 20r.

The control circuit 30s stores in advance each of the first probability range and the interval in which the hit signal ϕhitx is output. In the interval in which the hit signal ϕhitx is output, the control circuit 30s compares the 0/1-probability in the first data pattern with the first probability range. When the 0/1-probability is included in the first probability range, the control circuit 30s asserts the hit signal ϕhitx and supplies the hit signal ϕhitx to the correction tap circuit 10r in the interval that is stored in advance and corresponds to the first probability range.

The control circuit 30s stores in advance each of the second probability range and the interval in which the hit signal ϕhity is output. In the interval in which the hit signal ϕhity is output, the control circuit 30s compares the 0/1-probability in the second data pattern with the second probability range. When the 0/1-probability is included in the second probability range, the control circuit 30s asserts the hit signal ϕhity and supplies the hit signal ϕhity to the correction tap circuit 10r in the interval that is stored in advance and corresponds to the second probability range.

The control circuit 30s includes a plurality of pattern probability calculator/comparators 33s-x and 33s-y, a plurality of probability storages 34s-x and 34s-y, and a plurality of interval storages 35s-x and 35s-y. The probability storage 34s-x is connected with output nodes of registers of the n-th to (n+m−1)-th stages of the shift register 20r. The probability storage 34s-y is connected with output nodes of registers of the (n+m)-th to the (n+m+k)-th stages of the shift register 20r The probability calculator/comparator 33s-x receives a pattern (first data pattern) of the n-interval-prior data signal to the (n+m−1)-interval-prior data signal before the current time point, and acquires the "interval in which the hit signal ϕhitx is output" by referring to the interval storage 35s-x. The interval storage 35s-x stores the "interval in which the hit signal ϕhitx is output". The probability calculator/comparator 33s-x obtains the 0/1-probability in the received first data pattern, and further acquires the first probability range by referring to the probability storage 34s-x. The probability storage 34s-x stores the first probability range. The probability calculator/comparator 33s-x compares the 0/1-probability in the first data pattern with the first probability range. When the first probability range includes the 0/1-probability in the first data pattern, the probability calculator/comparator 33s-x asserts the hit signal ϕhitx, and supplies the hit signal ϕhitx to the feedback line Lf2-x in an interval that is stored in advance and corresponds to the first probability range. The interval stored in advance is an interval corresponding to the "interval in which the hit signal ϕhitx is output".

The probability calculator/comparator 33s-y receives a pattern (second data pattern) of the (n+m)-interval-prior data signal to the (n+m+k)-interval-prior data signal before the current time point, and acquires the "interval in which the hit signal ϕhity is output" by referring to the interval storage 35s-y. The probability storage 34s-y stores the second probability range. The interval storage 35s-y stores the "interval in which the hit signal ϕhity is output". The probability calculator/comparator 33s-y obtains the 0/1-probability in the received second data pattern, and further acquires the second probability range by referring to the probability storage 34s-y. The probability storage 34s-y stores the second probability range. The probability calculator/comparator 33s-y compares the 0/1-probability in the second data pattern with the second probability range. When the second probability range includes the 0/1-probability in the second data pattern, the probability calculator/comparator 33s-y asserts the hit signal ϕhity, and supplies the hit signal ϕhity to the feedback line Lf2-y in an interval that is stored in advance and corresponds to the second probability range. The interval stored in advance is an interval corresponding to the "interval in which the hit signal ϕhity is output".

The correction tap circuit 10r is similar to that in the ninth embodiment.

As described above, in the present embodiment, in the DFE circuit 3s, the tap coefficient is corrected while switching between the correction tap coefficients when the pattern of the data signals of a plurality of different predetermined intervals matches the predetermined pattern. With this configuration, correction can be performed for influence from each of the plurality of different predetermined intervals, whereby equalization accuracy can further be improved.

Eleventh Embodiment

Next, a semiconductor integrated circuit according to an eleventh embodiment will be described. The following description will focus on differences from the first embodiment to the tenth embodiment.

The eleventh embodiment is a combination of the fifth embodiment to the tenth embodiment.

Figure 16:
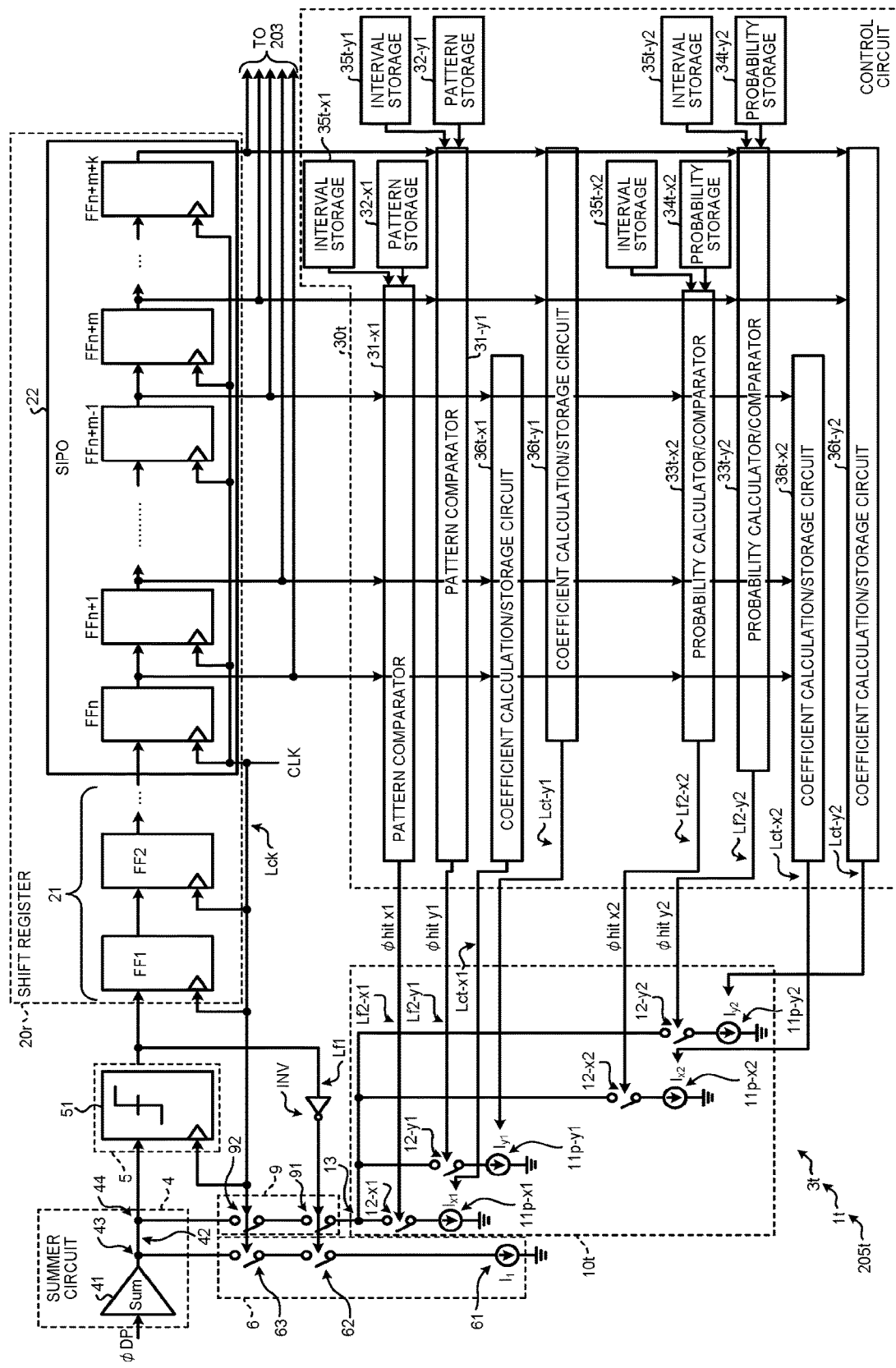
FIG. 16 is a circuit diagram illustrating an example of a configuration of a DFE circuit according to an eleventh embodiment.

Specifically, as illustrated in FIG. 16, an equalization circuit it of a semiconductor integrated circuit 205t has a DFE circuit 3t instead of the DFE circuit 3 (see FIG. 4) in the first embodiment. The DFE circuit 3t includes a correction tap circuit 10t, a shift register 20r, and a control circuit 30t instead of the correction tap circuit 10, the shift register 20, and the control circuit 30 (see FIG. 4). The shift register 20r is similar to that in the ninth embodiment (FIG. 14). The control circuit 30t receives a pattern (first data pattern) of the n-interval-prior data signal to the (n+m−1)-interval-prior data signal before the current point among the past data signals, and receives a pattern (second data pattern) of the (n+m)-interval-prior data signal to the (n+m+k)-interval-prior data signal before the current point among the past data signals, via the plurality of output nodes of the shift register 20r.

The control circuit 30t stores in advance each of the first predetermined pattern and the "interval in which the hit signal ϕhitx1 is output". The control circuit 30t compares the received first data pattern with the first predetermined patterns, and when the comparison results match, asserts the hit signal ϕhitx1, and supplies the hit signal ϕhitx1 to the correction tap circuit 10t in the interval that corresponds to the first predetermined pattern and is stored in advance. This interval stored in advance is an interval corresponding to the "interval in which the hit signal ϕhitx1 is output".

The control circuit 30t stores in advance each of the second predetermined pattern and the "interval in which the hit signal ϕhity1 is output". The control circuit 30t compares the received second data pattern with the second predetermined patterns, and when the comparison results match, asserts the hit signal ϕhity1 in the interval that corresponds to the second predetermined pattern and is stored in advance, and supplies the hit signal ϕhity1 to the correction tap circuit 10t. The interval stored in advance is an interval corresponding to the "interval in which the hit signal ϕhity1 is output".

The control circuit 30t stores in advance each of the first probability range and the "interval in which the hit signal ϕhitx2 is output". In the "interval in which the hit signal ϕhitx2 is output", the control circuit 30t compares the 0/1-probability in the first data pattern with the first probability range. When the 0/1-probability in the first data pattern is included in the first probability range, the control circuit 30t asserts the hit signal ϕhitx2 and supplies the hit signal ϕhitx2 to the correction tap circuit 10t in an interval that is stored in advance and corresponds to the first probability range. This prestored period is a period corresponding to the "interval in which the hit signal ϕhitx2 is output".

The control circuit 30t stores in advance each of the second probability range and the "interval in which the hit signal ϕhity2 is output". In the "interval in which the hit signal ϕhity2 is output", the control circuit 30t compares the 0/1-probability in the second data pattern with the second probability range. When the 0/1-probability in the second data pattern is included in the second probability range, the control circuit 30t asserts the hit signal ϕhity2 and supplies the hit signal ϕhity2 to the correction tap circuit 10t in an interval that is stored in advance and corresponds to the second probability range. The interval stored in advance is an interval corresponding to the "interval in which the hit signal ϕhity2 is output".

The control circuit 30t includes a plurality of pattern comparators 31-x1 and 31-y1, a plurality of pattern storages 32-x1 and 32-y1, a plurality of interval storages 35t-x1, 35t-y1, coefficient calculation/storage circuits 36t-x1 and 36t-y1, a plurality of probability calculators/comparators 33t-x2 and 33t-y2, a plurality of probability storage 34t-x2 and 34t-y2, a plurality of interval storages 35t-x2 and 35t-y2, and coefficient calculation/storage circuits 36t-x2 and 36t-y2.

The coefficient calculation/storage circuit 36t-x1 calculates an appropriate tap coefficient that is an appropriate value of the tap coefficient based on the first data pattern that matches the first predetermined pattern. The coefficient calculation/storage circuit 36t-x1 obtains the control value for achieving the appropriate current value Ix$_1$ based on the appropriate tap coefficient, stores the control value, and outputs the control value to the control line Lct-x1.

The coefficient calculation/storage circuit 36t-y1 calculates an appropriate tap coefficient that is an appropriate value of the tap coefficient based on the second data pattern that matches the second predetermined pattern. The coefficient calculation/storage circuit 36t-y1 obtains the control value for achieving the appropriate current value Ix$_2$ based on the appropriate tap coefficient, stores the control value, and outputs the control value to the control line Lct-y1.

The coefficient calculation/storage circuit 36t-x2 calculates an appropriate tap coefficient that is an appropriate value of the tap coefficient based on the first data pattern with the 0/1-probability included in the first probability range. The coefficient calculation/storage circuit 36t-x2 obtains the control value for achieving the appropriate current value Ix$_2$ based on the appropriate tap coefficient, stores the control value, and outputs the control value to the control line Lct-x2.

The coefficient calculation/storage circuit 36t-y2 calculates an appropriate tap coefficient that is an appropriate value of the tap coefficient based on the second data pattern with the 0/1-probability included in the second probability range. The coefficient calculation/storage circuit 36t-y2 obtains the control value for achieving the appropriate current value Iy$_2$ based on the appropriate tap coefficient, stores the control value, and outputs the control value to the control line Lct-y2.

The configurations and the operations of the plurality of pattern comparators 31-x1 and 31-y1, the plurality of pattern storages 32-x1 and 32-y1, and the plurality of interval storages 35t-x1 and 35t-y1 are similar to those of the plurality of pattern comparators 31-x and 31-y, the plurality of pattern storages 32-x and 32-y, and the plurality of interval storages 35r-x and 35r-y in the ninth embodiment.

The configurations and the operations of the plurality of probability calculators/comparators 33t-x2 and 33t-y2, the plurality of probability storages 34t-x2 and 34t-y2, and the plurality of interval storages 35t-x2 and 35t-y2 are similar to those of the plurality of probability calculators/comparators 33s-x2 and 33s-y2, the plurality of probability storages 34s-x and 34s-y, and the plurality of interval storages 35s-x and 35s-y in the tenth embodiment.

The correction tap circuit 10t includes a plurality of variable current sources 11p-x1, 11p-y1, 11p-x2, and 11p-y2, a plurality of switches 12-x1, 12-y1, 12-x2, and 12-y2, and the connection node 13. In the correction tap circuit 10t, the feedback line Lf2-x1 is connected to a control node of the switch 12-x1, the feedback line Lf2-y1 is connected to a control node of the switch 12-y1, the feedback line Lf2-x2 is connected to a control node of the switch 12-x2, and the feedback line Lf2-y2 is connected to a control node of the switch 12-y2. Each of the plurality of switches 12-x1, 12-y1, 12-x2, and 12-y2 is connected to the switch circuit 9 via the connection node 13.

The switch 12-x1 is provided between the connection node 13 and the variable current source 11p-x1. The switch circuit 9 and the variable current source 11p-x1 may be electrically connected to each other when the switch 12-x1 is turned ON in response to the assertion of the hit signal ϕhitx1. The switch 12-x1 may comprise an NMOS transistor. This hit signal ϕhitx1 may be a high active signal. The current Ix$_1$ supplied by the variable current source 11p-x1 is adjusted to a value corresponding to the correction tap coefficient ΔK-x1 based on the current state of the wired communication path 300 and the operating environment.

The switch 12-y1 is provided between the connection node 13 and the variable current source 11p-y1. The switch circuit 9 and the variable current source 11p-y1 may be electrically connected to each other when the switch 12-y1 is turned ON in response to the assertion of the hit signal ϕhity1. The switch 12-y1 may comprise an NMOS transistor. This hit signal ϕhity1 may be a high active signal. The current Ix$_1$ supplied by the variable current source 11p-y1 is adjusted to a value corresponding to the correction tap coefficient ΔK-y1 based on the current state of the wired communication path 300 and the operating environment.

The switch 12-x2 is provided between the connection node 13 and the variable current source 11p-x2. The switch circuit 9 and the variable current source 11p-x2 may be electrically connected to each other when the switch 12-x2 is turned ON in response to the assertion of the hit signal φhitx2. The switch 12-x2 may comprise an NMOS transistor. This hit signal φhitx2 may be a high active signal. The current $I_{x2}$ supplied by the variable current source 11p-x2 is adjusted to a value corresponding to the correction tap coefficient ΔK-x2 based on the current state of the wired communication path 300 and the operating environment.

The switch 12-y2 is provided between the connection node 13 and the variable current source 11p-y2. The switch circuit 9 and the variable current source 11p-y2 may be electrically connected to each other when the switch 12-y2 is turned ON in response to the assertion of the hit signal φhity2. The switch 12-y2 may comprise an NMOS transistor. This hit signal φhity2 may be a high active signal. The current $I_{y2}$ supplied by the variable current source 11p-y2 is adjusted to a value corresponding to the correction tap coefficient ΔK-y2 based on the current state of the wired communication path 300 and the operating environment.

As described above, in the present embodiment, the correction tap coefficient is dynamically adjusted in the DFE circuit 3t, so that the correction tap coefficient can be optimized to a value based on the state of the wired communication path 300 or the operating environment.

In the present embodiment, in the DFE circuit 3t, the tap coefficient is corrected while switching between the correction tap coefficients when the pattern of the data signals of a plurality of different predetermined intervals matches the predetermined pattern. With this configuration, correction can be performed for influence from each of the plurality of different predetermined intervals, whereby equalization accuracy can further be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor integrated circuit comprising:
   a summer circuit;
   a sampler electrically connected to an output node of the summer circuit;
   a shift register that is electrically connected to an output node of the sampler and includes K stages of registers, K being an integer that is equal to or larger than 3;
   a control circuit to which output nodes of respective registers of N-th to M-th stages among the K stages of registers are electrically connected, N being an integer larger than 1 and smaller than K, M being an integer larger than N and equal to or smaller than K;
   a first switch including one end electrically connected to the output node of the summer circuit; and
   a correction circuit including a first control node that is electrically connected to the control circuit through a first feedback line and an output node to which a second end of the first switch is electrically connected.

2. The semiconductor integrated circuit according to claim 1, wherein the correction circuit further includes a second control node that is electrically connected to the control circuit through a second feedback line.

3. The semiconductor integrated circuit according to claim 2, wherein the control circuit is configured to supply a first control signal corresponding to a first tap coefficient in a plurality of tap coefficients to the first feedback line when data output from the registers of the N-th to the M-th stages matches a first pattern, and to supply a second control signal corresponding to a second tap coefficient in the plurality of tap coefficients to the second feedback line when the data output from the registers of the N-th to the M-th stages matches a second pattern, the correction circuit is configured to generate a correction signal using the first tap coefficient when the first control node receives the first control signal through the first feedback line, and to generate a correction signal using the second tap coefficient when the second control node receives the second control signal through the second feedback line, and the generated correction signal is transmitted to output node of the summer circuit when the first switch is turned ON.

4. The semiconductor integrated circuit according to claim 2, wherein the control circuit is configured to supply a first control signal corresponding to a first tap coefficient in a plurality of tap coefficients to the first feedback line when an appearance probability of a given bit value in data output from the registers of N-th to M-th stages is included in a first range, and to supply a second control signal corresponding to a second tap coefficient in the plurality of tap coefficients to the second feedback line when the appearance probability of the given bit value in the data output from the registers of the N-th to M-th stages is included in a second range, the correction circuit is configured to generate a correction signal using the first tap coefficient when the first control node receives the first control signal through the first feedback line, and to generate a correction signal using the second tap coefficient when the second control node receives the second control signal through the second feedback line, and the generated correction signal is transmitted to the output node of the summer circuit when the first switch is turned ON.

5. The semiconductor integrated circuit according to claim 2, wherein the correction circuit further includes:
   a first current source;
   a second switch including a third end electrically connected to the first current source and a fourth end electrically connected to the output node thereof, and configured to be turned ON or OFF based on a control signal received by the first control node;
   a second current source; and
   a third switch including a fifth end electrically connected to the second current source and a sixth end electrically connected to the output node thereof, and configured to be turned ON or OFF based on a control signal received by the second control node.

6. The semiconductor integrated circuit according to claim 2, wherein the correction circuit further includes:
   a first variable current source;
   a second switch including a third end electrically connected to the first variable current source and a fourth end electrically connected to the output node thereof, and configured to be turned ON or OFF based on a control signal received by the first control node;
   a second variable current source; and a third switch including a fifth end electrically connected to the second variable current source and a sixth end electrically connected to the output node thereof, and configured to be turned ON or OFF based on a control signal received by the second control node.

7. The semiconductor integrated circuit according to claim 2, wherein the control circuit includes:
a first comparator circuit configured to compare a pattern of data output from the registers of the N-th to the M-th stages with a first pattern, and to supply a first control signal corresponding to a result of the comparison to the first feedback line; and
a second comparator circuit configured to compare the pattern of the output data with a second pattern, and to supply a second control signal corresponding to a result of the comparison to the second feedback line.

8. The semiconductor integrated circuit according to claim 2, wherein the control circuit includes:
a first comparator circuit configured to compare an appearance probability of a given bit value in data output from the registers of the N-th to the M-th stages with a first range, and to supply a first control signal corresponding to a result of the comparison to the first feedback line; and
a second comparator circuit configured to compare the appearance probability of the given bit value in the output data with a second range, and to supply a second control signal corresponding to a result of the comparison to the second feedback line.

9. The semiconductor integrated circuit according to claim 2, wherein
the correction circuit is electrically connected to the control circuit through a first coefficient control line and a second coefficient control line, and
the control circuit includes:
a first comparator circuit configured to compare a pattern of data output from the registers of the N-th to the M-th stages with a first pattern, and to supply a first control signal corresponding to a result of the comparison to the first feedback line;
a second comparator circuit configured to compare the pattern of the output data with a second pattern, and to supply a second control signal corresponding to a result of the comparison to the second feedback line;
a first calculation circuit configured to calculate a first tap coefficient corresponding to the first pattern based on the pattern of the output data, and to supply a first coefficient control signal based on a result of the calculation to the first coefficient control line; and
a second calculation circuit configured to calculate a second tap coefficient corresponding to the second pattern based on the pattern of the output data, and to supply a second coefficient control signal based on a result of the calculation to the second coefficient control line.

10. The semiconductor integrated circuit according to claim 2, wherein
the correction circuit is electrically connected to the control circuit through a first coefficient control line and a second coefficient control line, and
the control circuit includes:
a first comparator circuit configured to compare an appearance probability of a given bit value in data output from the registers of the N-th to the M-th stages with a first range, and to supply a first control signal corresponding to a result of the comparison to the first feedback line;
a second comparator circuit configured to compare the appearance probability of the given bit value in the output data with a second range, and to supply a second control signal corresponding to a result of the comparison to the second feedback line;
a first calculation circuit configured to calculate a first tap coefficient corresponding to the first range based on the pattern of the output data, and to supply a first coefficient control signal based on a result of the calculation to the first coefficient control line; and
a second calculation circuit configured to calculate a second tap coefficient corresponding to the second range based on the pattern of the output data, and to supply a second coefficient control signal based on a result of the calculation to the second coefficient control line.

11. The semiconductor integrated circuit according to claim 1, wherein
the control circuit is configured to, when data output from the registers of the N-th to the M-th stages matches a first pattern, select a first tap coefficient in a plurality of tap coefficients and to supply a first control signal corresponding to the first tap coefficient to the first feedback line,
the correction circuit is configured to generate a correction signal using the first tap coefficient when the first control node receives the first control signal through the first feedback line, and
the generated correction signal is transmitted to the output node of the summer circuit when the first switch is turned ON.

12. The semiconductor integrated circuit according to claim 1, wherein
the control circuit is configured to, when an appearance probability of a given bit value in data output from the registers of the N-th to the M-th stages is included in a first range, select a first tap coefficient in a plurality of tap coefficients and to supply a first control signal corresponding to the first tap coefficient to the first feedback line,
the correction circuit is configured to generate a correction signal using the first tap coefficient when the first control node receives the first control signal through the first feedback line, and
the generated correction signal is transmitted to the output node of the summer circuit when the first switch is turned ON.

13. The semiconductor integrated circuit according to claim 1, wherein the correction circuit further includes:
a first current source; and
a second switch including a third end electrically connected to the first current source and a fourth end electrically connected to the output node thereof, and configured to be turned ON or OFF based on a control signal received by the first control node.

14. The semiconductor integrated circuit according to claim 1, wherein the correction circuit includes:
a first variable current source; and
a second switch including a third end electrically connected to the first variable current source and a fourth end electrically connected to the output node thereof, and configured to be turned ON or OFF based on a control signal received by the first control node.

15. The semiconductor integrated circuit according to claim 1, wherein the control circuit includes a comparator circuit configured to compare a pattern of data output from the registers of the N-th to the M-th stages with a first pattern, and to supply a first control signal corresponding to a result of the comparison to the first feedback line.

16. The semiconductor integrated circuit according to claim 1, wherein the control circuit includes a comparator circuit configured to compare an appearance probability of a given bit value in data output from the registers of the N-th to the M-th stages with a first range, and to supply a first control signal corresponding to a result of the comparison to the first feedback line.

17. The semiconductor integrated circuit according to claim 1, wherein
the correction circuit is electrically connected to the control circuit through a first coefficient control line, and
the control circuit includes:
a comparator circuit configured to compare a pattern of data output from the registers of the N-th to the M-th stages with a first pattern, and to supply a first control signal corresponding to a result of the comparison to the first feedback line; and
a calculation circuit configured to calculate a first tap coefficient corresponding to the first pattern based on the pattern of the output data, and to supply a first coefficient control signal based on a result of the calculation to the first coefficient control line.

18. The semiconductor integrated circuit according to claim 1, wherein
the correction circuit is electrically connected to the control circuit through a first coefficient control line, and
the control circuit includes:
a comparator circuit configured to compare an appearance probability of a given bit value in data output from the registers of the N-th to the M-th stages with a first range, and to supply a first control signal corresponding to a result of the comparison to the first feedback line; and
a calculation circuit configured to calculate a first tap coefficient corresponding to the first range based on the pattern of the output data, and to supply a first coefficient control signal based on a result of the calculation to the first coefficient control line.

19. The semiconductor integrated circuit according to claim 1, further comprising a tap circuit including a first end electrically connected to the output node of the summer circuit.

20. A reception device comprising:
the semiconductor integrated circuit according to claim 1; and
a circuit that receives data output from the semiconductor integrated circuit.

* * * * *